(12) United States Patent
Miller et al.

(10) Patent No.: US 6,996,249 B2
(45) Date of Patent: Feb. 7, 2006

(54) APPLYING INFORMED CODING, INFORMED EMBEDDING AND PERCEPTUAL SHAPING TO DESIGN A ROBUST, HIGH-CAPACITY WATERMARK

(75) Inventors: Matthew L. Miller, Princeton, NJ (US); Ingemar J. Cox, West Windsor, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 635 days.

(21) Appl. No.: 10/115,999

(22) Filed: Apr. 4, 2002

(65) Prior Publication Data
US 2003/0133590 A1 Jul. 17, 2003

Related U.S. Application Data

(60) Provisional application No. 60/347,428, filed on Jan. 11, 2002, provisional application No. 60/347,366, filed on Jan. 11, 2002.

(51) Int. Cl.
*G06K 9/00* (2006.01)

(52) U.S. Cl. .................................... 382/100; 341/82

(58) Field of Classification Search ............... 382/100, 382/232, 244, 247, 243, 264, 275, 274, 210, 382/252, 287; 713/176; 380/54; 714/200, 714/273; 341/50, 51, 82, 88
See application file for complete search history.

(56) References Cited

U.S. PATENT DOCUMENTS

| | | | | |
|---|---|---|---|---|
| 6,104,434 A * | 8/2000 | Nakagawa et al. | .... | 375/240.16 |
| 6,128,736 A * | 10/2000 | Miller | ........................ | 713/176 |
| 6,272,177 B1 * | 8/2001 | Murakami et al. | ..... | 375/240.03 |
| 6,292,199 B1 * | 9/2001 | Herpel | ....................... | 345/474 |
| 6,307,949 B1 * | 10/2001 | Rhoads | ........................ | 382/100 |
| 6,381,341 B1 * | 4/2002 | Rhoads | ........................ | 382/100 |
| 6,430,222 B1 * | 8/2002 | Okada | .................... | 375/240.03 |
| 6,480,497 B1 * | 11/2002 | Flammer et al. | ............ | 370/400 |
| 6,683,988 B1 * | 1/2004 | Fukunaga et al. | ........... | 382/236 |
| 6,728,410 B1 * | 4/2004 | Fukunaga | .................... | 382/236 |
| 6,782,116 B1 * | 8/2004 | Zhao et al. | .................. | 382/100 |
| 6,804,374 B1 * | 10/2004 | Beattie et al. | .............. | 382/100 |
| 6,856,693 B2 * | 2/2005 | Miller | ......................... | 382/100 |
| 2003/0066014 A1 * | 4/2003 | Van Dijk et al. | ............ | 714/774 |
| 2003/0095056 A1 * | 5/2003 | Tolhuizen et al. | ............. | 341/94 |
| 2004/0022411 A1 * | 2/2004 | Tamaru et al. | ................ | 382/100 |
| 2004/0228502 A1 * | 11/2004 | Bradley et al. | .............. | 382/100 |
| 2005/0025338 A1 * | 2/2005 | Zhao et al. | .................. | 382/100 |
| 2005/0100214 A1 * | 5/2005 | Zhang et al. | ................ | 382/179 |

(Continued)

OTHER PUBLICATIONS

Chen, B. et al., "An Information-Theoretic Approach to the Design of Robust Digital Watermarking Systems," IEEE Transactions on Acoustics, Speech, and Signal Processing, pp. 2061-2064, 1999.

(Continued)

Primary Examiner—Bhavesh M. Mehta
Assistant Examiner—Barry Choobin
(74) Attorney, Agent, or Firm—Scully, Scott, Murphy & Presser

(57) ABSTRACT

A watermark message embedded in a cover work can be made robust to various types of post-embedding operations, while simultaneously minimizing perceptual impact on the cover work. This is accomplished by the informed coding of the watermark message to be embedded. This is also accomplished by the informed embedding of the watermark message code in the cover work. Finally, the watermark message code may be perceptually shaped to minimize impact on the fidelity of the watermarked work. Further, these techniques may be combined for maximum effect.

40 Claims, 16 Drawing Sheets

U.S. PATENT DOCUMENTS

2005/0129270 A1 * 6/2005 Prakash .................. 382/100

OTHER PUBLICATIONS

Chen, B. et al., "Digital Watermarking and Information Embedding Using Dither Modulation", IEEE Second Workshop on Multimedia Signal Processing, pp. 273-278, 1998.

Chen, B. et al., "Preprocessed and Postprocessed Quantization Index Modulation Methods for Digital Watermarking", Security and Watermarking of Multimedia Contents II, vol. 3971, pp. 48-59, 2000.

Chou, J. et al., "On the Duality between Distributed Source Coding and Data Hiding", Thirty-third Asilomar Conference on Signals, Systems, and Computers, vol. 2, pp. 1503-1507, 1999.

Conway, J.H. et al., *Spheres Packing, Lattices and Groups*, Springer-Verlag, Chapter 4, 1998.

Costa, M., "Writing on Dirty Paper", IEEE Transactions on Information Theory, Vo. IT-29, No. 3, pp. 439-441, 1983.

Cox, I.J. et al., *Digital Watermarking*, Morgan Kaufmann, pp. 117-155, 2001.

Cox, I.J. et al., "Watermarking as Communications with Side Information", Proceedings of the IEEE, vol. 87, No. 7, pp. 1127-1141, 1999.

Eggers, J.J. et al., "Public Key Watermarking By Eigenvectors of Linear Transforms", Proceedings of the European Signal Processing Conference (EUSIPCO), Tampere Finland, 2000.

Eggers, J.J. et al., "A Blind Watermarking Scheme Based on Structured Codebooks", IEE Seminar on Secure Images and Image Authentication, pp. 4/1-4/21, 2000.

Miller, M.L. et al., "Informed Embedding: Exploiting Image and Detector Information During Watermark Insertion", IEEE International Conference on Image Processing, pp. 1-4, Sep. 2000.

Miller, M.L. "Watermarking with Dirty-Paper Codes", Proceedings of the International Conference on Image Processing—ICIP, pp. 538-541, 2001.

Moulin, P. et al., "Information-Theoretic Analysis of Information Hiding", Proceedings of the IEEE International Symposium on Information Theory, Aug. 1998.

Moulin, P. et al., "Information-Theoretic Analysis of Information Hiding", Proceedings of the IEEE International Conference on Acoustics, Speech, and Signal Processing (ICASSP), Jun. 2000.

Petrovic, R. et al., "Data Hiding within Audio Signals", Proceedings in the Fourth International Conference on Telecommunications in Modern Satellite, Cable and Broadcasting Services (TELSIKS), pp. 88-95, 1999.

Pradhan, S.S. et al., "Distributed Source Coding: Symmetric Rates and Applications to Sensor Networks", Proceedings of the IEEE Data Compression Conference, pp. 363-372, 2000.

Ramkumar, M., "Data Hiding in Multimedia—Theory and Applications", Ph.D. Thesis, New Jersey Institute of Technology, 1999.

Shannon, C.E., "Channels with Side Information at the Transmitter", IBM Journal of Research and Development, pp. 289-293, Oct. 1958.

van den Branden Lambrecht, C. et al., "Perceptual Quality Metric for Digitally Coded Color Images", Proceedings of the European Conference on Signal Processing and Communications (EUSIPCO), pp. 1175-1178, 1996.

Viterbi, A.J., *CDMA: Principles of Spread Spectrum Communication*, Addison-Wesley, pp. 124-175, 1995.

Voloshynovskiy, S. et al., "A Stochastic Approach to Content Adaptive Digital Image Watermarking", Third International Workshop on Information Hiding, pp. 211-227, 1999.

Watson, A.B., "DCT Quantization Matrices Visually Optimized for Individual Images", Human Vision, Visual Processing, and Digital Display IV, SPIE, vol. 1913, pp. 202-216, 1993.

* cited by examiner

APPLYING INFORMED CODING, INFORMED EMBEDDING AND PERCEPTUAL SHAPING TO DESIGN A ROBUST, HIGH-CAPACITY WATERMARK

CROSS REFERENCE TO RELATED APPLICATIONS

This application claims the benefit under 35 U.S.C. § 119(e) of U.S. Provisional Application Ser. No. 60/347,366, filed Jan. 11, 2002, and U.S. Provisional Application Ser. No. 60/347,428, filed Jan. 11, 2002. The full disclosures of both applications are hereby incorporated by reference for all purposes.

BACKGROUND OF THE INVENTION

1. Field of Invention

The invention is related to the field of digital watermarking, and more particularly to informed techniques for coding a watermark message and embedding it into a cover work.

2. Description of Related Art

In recent years, several researchers have recognized that watermarking with blind detection can be modeled as communication with side-information at the transmitter. This has led to the development of informed coding, in which code words or signals used to represent messages are dependent on the cover work, and informed embedding, in which signals are shaped according to the cover work before embedding. Some researchers have employed informed coding to embed large data payloads in images—on the order of 1000 or more bits—but their methods involve only simple forms of informed embedding. Furthermore, as most of these methods are based on some form of lattice quantization, they exhibit only limited robustness against simple valumetric scaling, such as changes in image contrast or audio volume.

The problem remains of how to embed a large-payload watermark message in a digitally encoded work in a manner which will be resilient against typical post-watermarking effects, e.g., signal noise, filtering, scaling, and/or compression, while at the same time maintaining acceptable levels of perceptual fidelity to the original cover work.

BRIEF SUMMARY OF THE INVENTION

It is an object of the present invention to accomplish the informed coding of a watermark message, comprising the definition of a code in which each message is represented by a plurality of alternate code words, the identification of the set of code words that represent a given message, and the embedding the code word in that set which will result in the smallest distortion of the cover work. The code is defined by a modified trellis coding technique of the present invention.

It is further an object of the present invention to accomplish perceptual shaping of a watermark message code by modifying the code in the embedding process to conform to a predetermined perceptual "slack", in order to minimize the perceptual impact of the watermark message on the cover work.

It is further an object of the present invention to accomplish the informed embedding a watermark message code in a cover work to efficiently and reliably embed the watermark message code in the cover work while limiting the perceptual impact on the cover work. This is accomplished by finding an incorrect message likely to be extracted from the cover work, and calculating a measure of the probability that the incorrect watermark message code would not be extracted from the cover work. If this measure is less than a predetermined value, the cover work is modified to ensure that the incorrect watermark message is less likely to be extracted. The embedding process is reiterated until only the correct watermark message is likely to be extracted. To improve the performance of the watermark message code, these techniques may be combined.

BRIEF DESCRIPTION OF THE DRAWINGS

These and other features, aspects, and advantages of the apparatus and methods of the present invention will become better understood with regard to the following description, appended claims, and accompanying drawings, wherein like reference numerals designate the same elements across the several views, where:

DETAILED DESCRIPTION OF THE INVENTION

Figure 1:
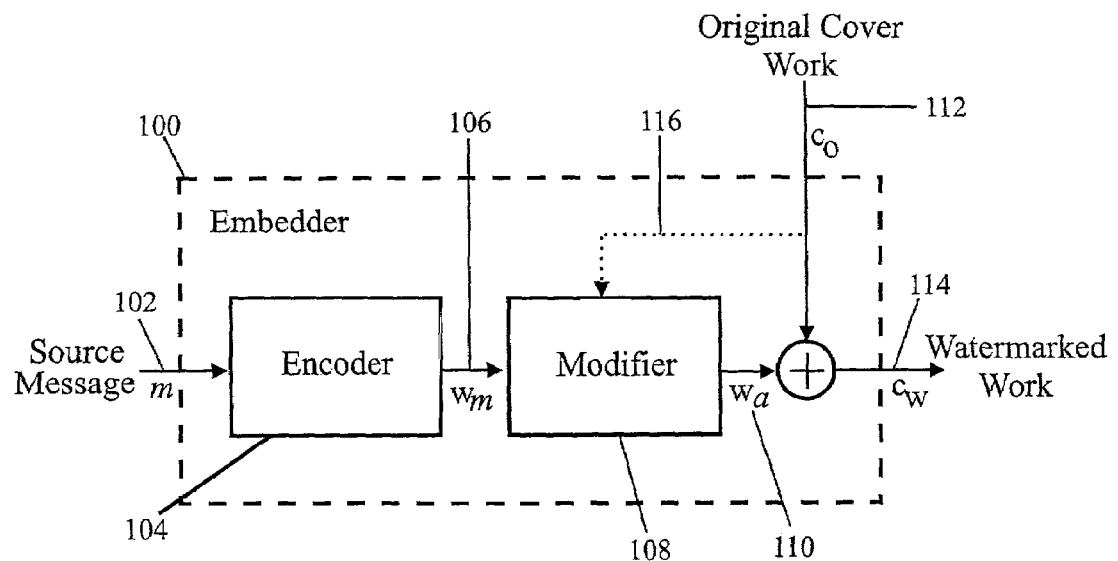
FIG. 1 is a schematic illustration of an informed embedder.

FIG. 1 illustrates the basic idea of an informed watermarking system 100. Here, watermark embedding is viewed as a three-step process. First, the source message 102 to be embedded is input to an encoder 104, and encoded as a message signal 106, $w_m$. Second, the signal 106 is input to a modifier 108, and modified in preparation for embedding, yielding a modified signal 110, $w_a$. Finally, the modified signal 110 is added to the original cover work 112, $c_o$, to obtain the watermarked work 114, $c_w$. The message 102 will be comprised of symbols drawn from an alphabet. A binary alphabet of 1 and 0 is typical, but other characters may be used. The cover work may comprise an image, a video clip, an audio clip, or any other digitally encoded content. An image is often described herein as an exemplary cover work, however, the invention is not limited to the watermarking of images, and those skilled in the art will recognize the interchangeability of content types.

In blind embedding, the modification step is performed independently of the cover work. In such cases, just a simple, global scaling can be used. In informed embedding, by contrast, the modification is a function of the cover work 112, and the message signal 106, illustrated by link 116.

Since complete information about the cover work 112 is available, an informed watermarking system 100 has complete control over the final, watermarked work. That is, it can select any work as $c_w$ by letting $w_a=c_w-c_o$. The task is to find a work that satisfies two conflicting criteria: 1) $c_w$ should be similar enough to $c_o$ to be perceptually indistinguishable, and 2) $c_w$ should be close enough to $w_m$ to be detected as containing the watermark, even after distortion by subsequent processing.

In practice, an informed embedding algorithm can be implemented using methods for estimating perceptual distance and watermark robustness. The algorithm may then attempt to either 1) maximize the estimated robustness while keeping a constant perceptual distance, or 2) minimize the perceptual distance while keeping a constant robustness. Most watermarking applications are best served by embedders that maintain constant robustness, and the illustrative embodiment of an embedding algorithm is therefore disclosed using the latter constraint. Some applications, however, can demand a constant fidelity, and optimization according to the former constraint could then be achieved without departing from the scope of the invention.

In order to describe the exemplary watermark embedding algorithm according to the present invention, first the detection algorithm must be described. More than one correlation-based detection scheme may be suitable, as discussed in Cox, et al., *Digital Watermarking*, however the methods of the present invention are not limited to correlation-based schemes. Next, a measure of robustness must be defined. Two embedding methods that seek to obtain a specific value of this robustness measure while keeping the mean squared error low between the original cover work 112 and watermarked work 114 are described. The mean square error is used as a measure of the perceptual distance between the original and watermarked works. The invention is not limited to this measure, as other measures known in the art, such as the Watson Distance, are suitable as well. The first of these two methods is general, and can be applied with a variety of different detection algorithms. The second is specific to the detector described, and is substantially faster than the general method. Experiments show that this second embedding method yields substantially better results than a simple, blind embedder.

Detection Algorithm

Figure 2:
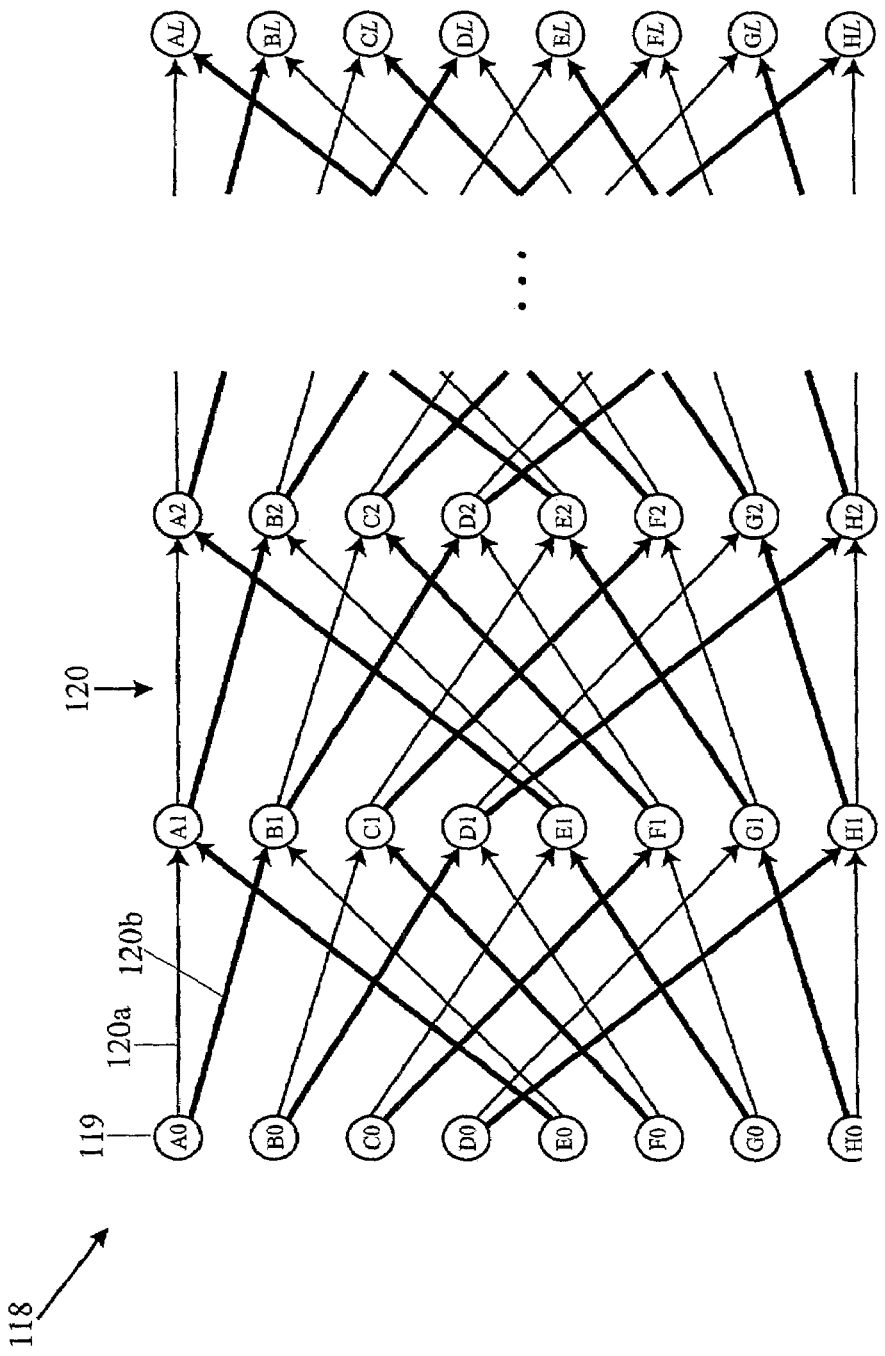
FIG. 2 illustrates a traditional Trellis code structure.

An exemplary watermarking system is built around a trellis-code, as illustrated in FIG. 2. This code is similar to that used in the E_TRELLIS8/D_TRELLIS8 watermarking system defined in Cox, et al., *Digital Watermarking*, hereby incorporated by reference in its entirety. Each path through the trellis 118, originating at node 119, labeled A0, represents a specific message. Since two arcs 120a, 120b, exit each node, there are $2^L$ possible paths, where L is the length of the paths. Thus, the system encodes L bits. In an exemplary embodiment, L=1380.

Each arc 120 in the trellis 118 is labeled with a randomly-generated, length N reference vector. Each path, and thus each message, is coded with a length L×N vector that is the concatenation of the labels for the arcs it contains. In the exemplary embodiment, N=12.

Figure 3:
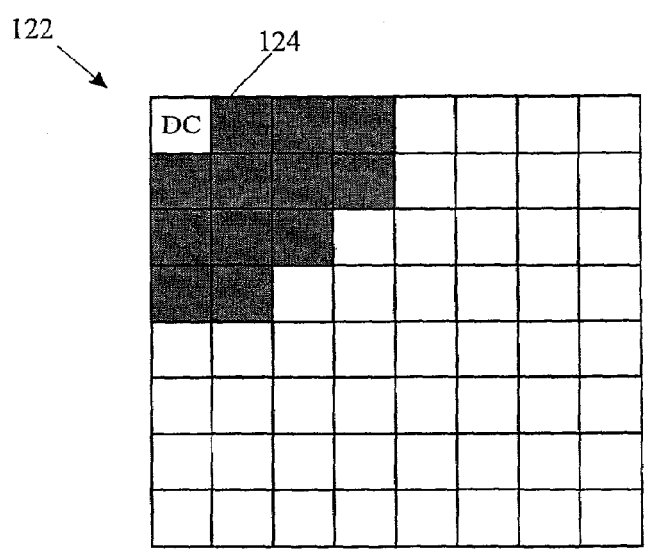
FIG. 3 indicates the terms of an image's 8×8 block DCT used in the exemplary embodiment of the present invention.

An exemplary detection algorithm comprises the following steps. The image is converted into the 8×8 block-DCT domain 122 of FIG. 3. All N-frequency AC terms of the DCT blocks 124 are placed into a single, length L×N vector, in random order. This is referred to as the extracted vector. The DCT terms used are shown in FIG. 3. A Viterbi decoding algorithm is used to identify the most likely path through the trellis 118. For correlation detectors, this is equivalent to finding the L×N vector that has the highest correlation with the extracted vector. The message that is represented by the highest-correlation path is identified as the source message 102.

Note that this exemplary detection algorithm's method for obtaining an extracted vector is not the only one possible. Alternative methods include, but are not limited to: using the pixel values themselves as the values in the extracted vector, using correlations between the image and several predefined patterns, using coefficients from the full-image DCT, using coefficients from a wavelet decomposition of the image, using the magnitudes of Fourier coefficients, and using the phases of Fourier coefficients. A similar range of possibilities exists for media other than images, such as audio, video, and solid models.

This detection algorithm does not attempt to determine whether the work contains a watermark. It simply maps every possible work into an L-bit message, regardless of whether the work has had a watermark embedded. In large payload applications it is usually not important for the detector to determine whether a watermark is present, since most combinations of bit values are not meaningful. For example, suppose the system is used to embed strings of 172 ASCII characters. An unwatermarked work will yield an unintelligible string, so it can easily be recognized as unwatermarked when the string is displayed.

Alternatively, if the detector needs to determine the presence of watermarks, some number of bits can be used to contain an error detection checksum or signature of the source message 102. If the signature does not match the source message 102, the detector announces that there is no watermark. This reduces the payload by a small amount, but it yields a detector with an easily predicted false positive probability. For example, if 20 bits are used for the signature, then the probability of a false positive is $2^{-20}$.

Robustness

Since the exemplary detector does not test for the presence of a watermark, previous measures of robustness that use correlation coefficient to test whether or not a mark is present are not appropriate. Instead of estimating the likelihood that a watermarked work will be detected as unwatermarked, an estimate of the likelihood that the watermarked work will be detected as containing the wrong source message 102 is required.

Consider a simple system in which there are only two possible messages 102, represented by two different vectors. One of the vectors is denoted g, and the other b. When presented with a work, c, the detector returns the message associated with g if g·c>b·c, where $$g \cdot c = \sum_i g[i]c[i]$$

is the correlation between g and c.

Vector g is the good vector, the one to be embedded into a cover work 112, $c_o$. Vector b is a bad vector, one to avoid the watermarked work being confused with. The task is to estimate the chances that a proposed watermarked work 114, $c_w$, will, after corruption by subsequent processing, be detected as containing the message g rather than the message b. More precisely, a value is needed that is monotonically related to the probability that message g will be correctly detected in a corrupted version of the watermarked work 114, $c_w$.

The assumption is made that the distortions applied to the watermarked work 114 after watermark embedding can be modeled as the addition of white Gaussian noise. Thus, assume that a detector will receive $c_{wn} = c_w + n$, where n is a length L×N vector whose elements are drawn independently from a Gaussian distribution with variance $\sigma_n^2$. The probability that g will be detected in $c_{wn}$ is $$P\{g \cdot c_{wn} > b \cdot c_{wn}\} =$$
$$P\{g \cdot (c_w + n) > b \cdot (c_w + n)\} =$$
$$P\{(g-b) \cdot c_w > (b-g) \cdot n\} =$$
$$P\left\{\frac{(g-b) \cdot c_w}{|g-b|} > \sigma_n r\right\}$$

where r is a random scalar value drawn from a unit-variance, Gaussian distribution. Clearly, the larger the value of $$R_0(c_w, g, b) = \frac{(g-b) \cdot c_w}{|g-b|},$$

the higher the probability that it will be greater than $\sigma_n r$, and the greater the chances that the watermark g will be correctly detected in $c_{wn}$. $R_0(\ )$, then, is the robustness measure for a simple, two-message watermarking system. Conceptually, $R_0(\ )$ is the inverse of the probability that a given bad message, b, would be confused with a given good message, g, from within a watermarked cover work, $c_w$.

To extend this measure to larger payloads, take the minimum of $R_0$ over all possible erroneous message vectors, $b_1 \ldots b_{2^L-1}$. Thus, $$R(c_w, g) = \min_{i=1}^{2^L-1} R_0(c_w, g, b_i)$$

Figure 4:
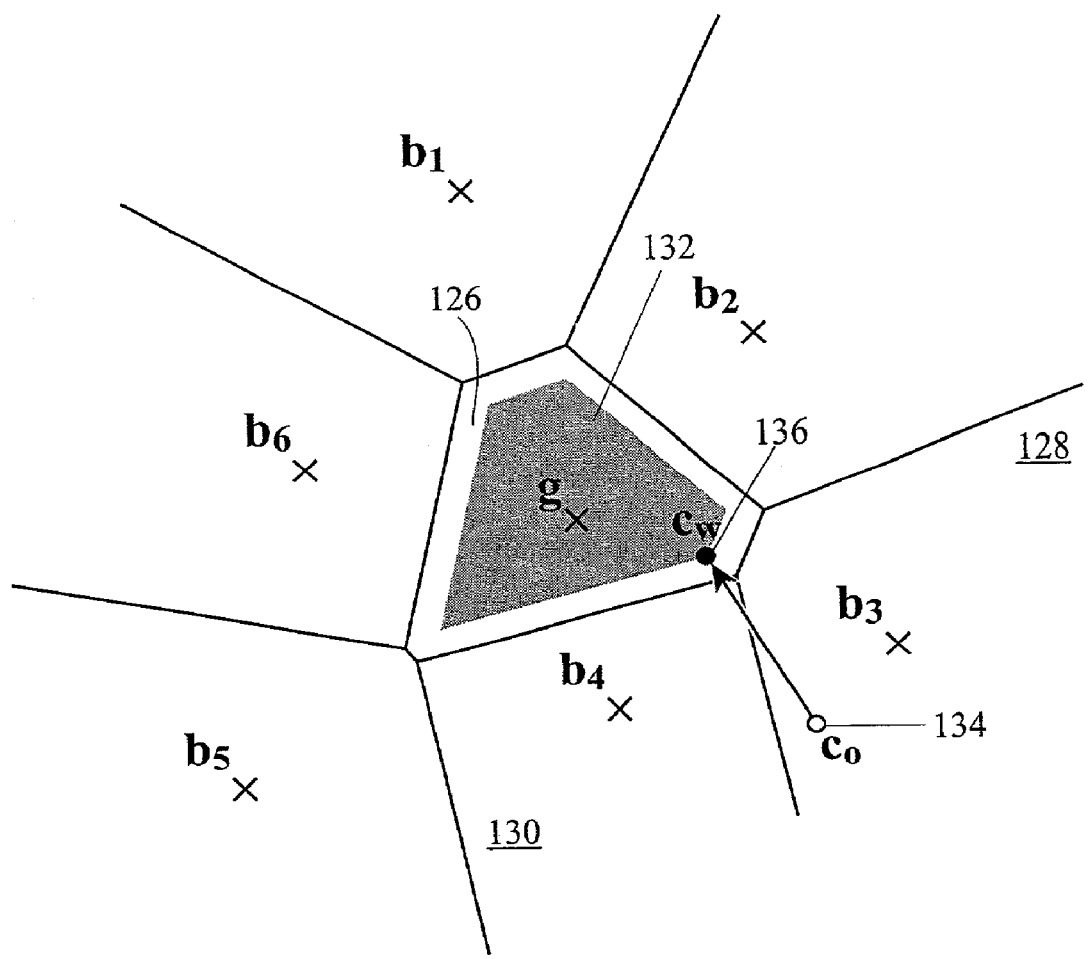
FIG. 4 is a Voronoi diagram, illustrating a geometric interpretation of the watermark embedding region.

FIG. 4 illustrates a geometric interpretation of the embedding region that results when we specify that $R(c_w, g)$ must be greater than or equal to a given value. The figure shows a Voronoi diagram representing the detection regions for various messages. Each point on the diagram corresponds to some possible work. Regions 126, 128, 130, define the message vectors that would be decoded, e.g., g, $b_1$, $b_2$, respectively, from any work lying in those regions.

By specifying a minimum value for $R(c_w, g)$, we are insisting that $c_w$ must lie a certain distance from the edge of region 126, the detection region for g. The region of acceptable robustness is indicated by the shaded area 132.

FIG. 4 also illustrates the behavior of an ideal embedder using this robustness measure. The open circle 134 corresponds to the unwatermarked cover work 112, and the filled circle 136 corresponds to the closest possible watermarked work 114 with acceptable robustness.

General Embedding Algorithm

In practice, it is difficult to implement an algorithm to find the optimal watermarked work, as illustrated in FIG. 4. Instead, it is more practical to use a sub-optimal, iterative algorithm. First, a general version of this algorithm is presented that can be used with a wide variety of watermark coding schemes. Next, a version specifically designed for the trellis-coded watermarks is presented.

Assume a black-box watermark encoder, W(m), that maps a sequence of bits, m, into a watermark signal, $w_m$. Further, assume a black-box watermark detector, D(c), that maps a work, c, into the sequence of bits corresponding to the watermark signal with which the work has the highest correlation. No assumptions are made about how these two functions work internally.

Given a cover work 112, $c_o$, a source message 102 to embed, m, and a target robustness value $R_t$, the algorithm proceeds as follows: 1) Set g=W(m) and $c_w=c_o$; 2) find the signal b≠g that minimizes $R_0(c_w,g,b)$; 3) if $R_0(c_w,g,b) \geq R_t$, then terminate; 4) Otherwise, modify $c_w$ so that $R_0(c_w,g,b)=R_t$, and go to step 2.

The modification of $c_w$ is performed as follows:

$$d = \frac{g-b}{|g-b|} \quad (1.1)$$
$$\alpha = R_t - R_0(c_w, g, b)$$
$$c_w \leftarrow c_w + \alpha d$$

The new $c_w$ yields $R_0(c_w,g,b)$ exactly equal to $R_t$, while having a minimum Euclidian distance from the previous $c_w$.

Figure 5:
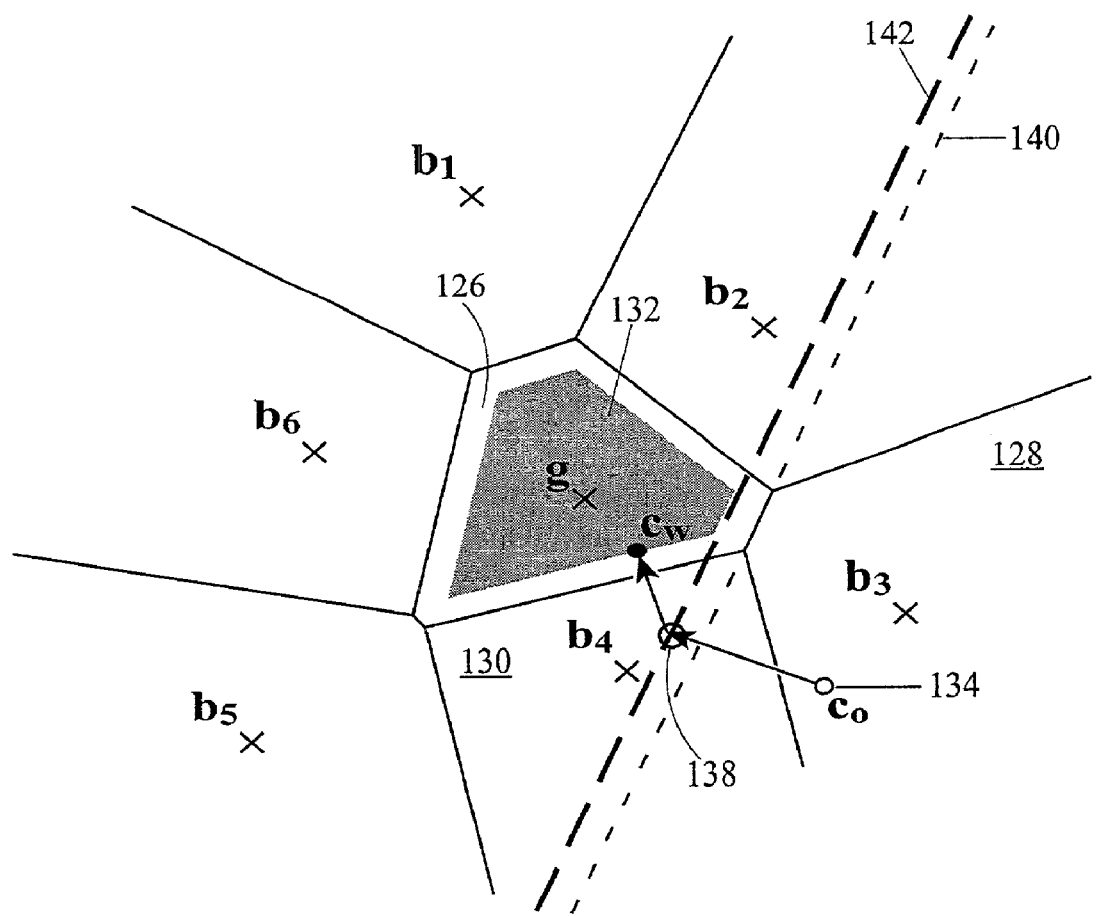
FIG. 5 illustrates the behavior of the embedding algorithm of the present invention in the Voronoi diagram of FIG. 4.

The operation of this algorithm is shown geometrically in FIG. 5. In the first iteration, $c_w$ lies in the detection region for $b_3$, so b=$b_3$ in step 2, and $c_w$ is moved to a point beyond the boundary 140 between g and $b_3$. Note that this interim point 138 is located on a line 142 parallel to the boundary 140, offset by a distance proportional to $R_t$.

In the second iteration, b=$b_4$, and g is moved into the detection region for g. In the final iteration, the closest bad vector is still $b_4$, but $R_0(c_w,g,b_4)$ is already satisfactory, so the algorithm terminates. FIG. 5 clearly illustrates that this algorithm is sub-optimal, since it does not yield the optimal point 136 identified in FIG. 4. Nevertheless, it is practical to implement.

The identification of b in step 2 depends on the method of coding. For most codes, it is not easy. A simple, Monte Carlo approach can be applied by letting b=W(D($c_w$+n)), where n is some random noise. If a small amount of noise is added to $c_w$, and the detector returns a message other than m, then b is likely to yield a low value of $R_0$. If there exist any vectors that yield values of $R_0$ below the target value, $R_t$, then b is likely to be one of them.

The best amount of noise to add changes as the embedding process progresses. In the first iteration, when $c_w=c_o$, it is unlikely that D($c_w$)=m, so we need not add any noise at all to find the nearest bad vector. This will remain true through several iterations, until D($c_w$)=m. At that point, the closest bad vectors are likely to yield very low values of $R_0$, so we need add only a small amount of noise to find them. As $c_w$ is modified to be robust against confusion with these-vectors, the remaining bad vectors yield higher values of $R_0$, and thus require the addition of more noise. In general, if too little noise is added, $W(D(c_w+n))$ will equal g. If too much noise is added, $W(D(c_w+n))$ has a high chance of producing a vector for which $R_o( )$ is much larger than the minimum available value.

Therefore the amount of noise added is dynamically adjusted at each iteration. At the beginning, the standard deviation of the noise, $\sigma_n$, is 0, so no noise is added. Whenever $W(D(c_w+n))$ yields g, $\sigma_n$ is increased by a small, fixed amount, $\delta$. When $W(D(c_w+n))$ yields a bad vector, b, but $R_0(c_w,g,b)$ is greater than or equal to $R_t$, we decrease $\sigma_n$ by $\delta$. If $W(D(c_w+n))$ yields a bad vector, b, and $R_0(c_w, g, b)<R_t$, we modify $c_w$ and leave D unchanged. In an exemplary embodiment of the method, $\delta=0.1$.

Since this Monte Carlo approach does not guarantee to find the b that minimizes $R_0(c_w, g, b)$ in each iteration, a preferred algorithm should not be terminated the first time that $R_0(c_w,g,b)$ is greater than or equal to the target value. There might still be some other b for which $R_0(c_w, g, b)<R_t$. Therefore a count is maintained of the number of consecutive b's found for which $R_0(c_w, g, b)>=R_t$. The algorithm terminates when this count reaches a specified limit. In an exemplary embodiment of the method, the limit was set at 100.

Figure 17:
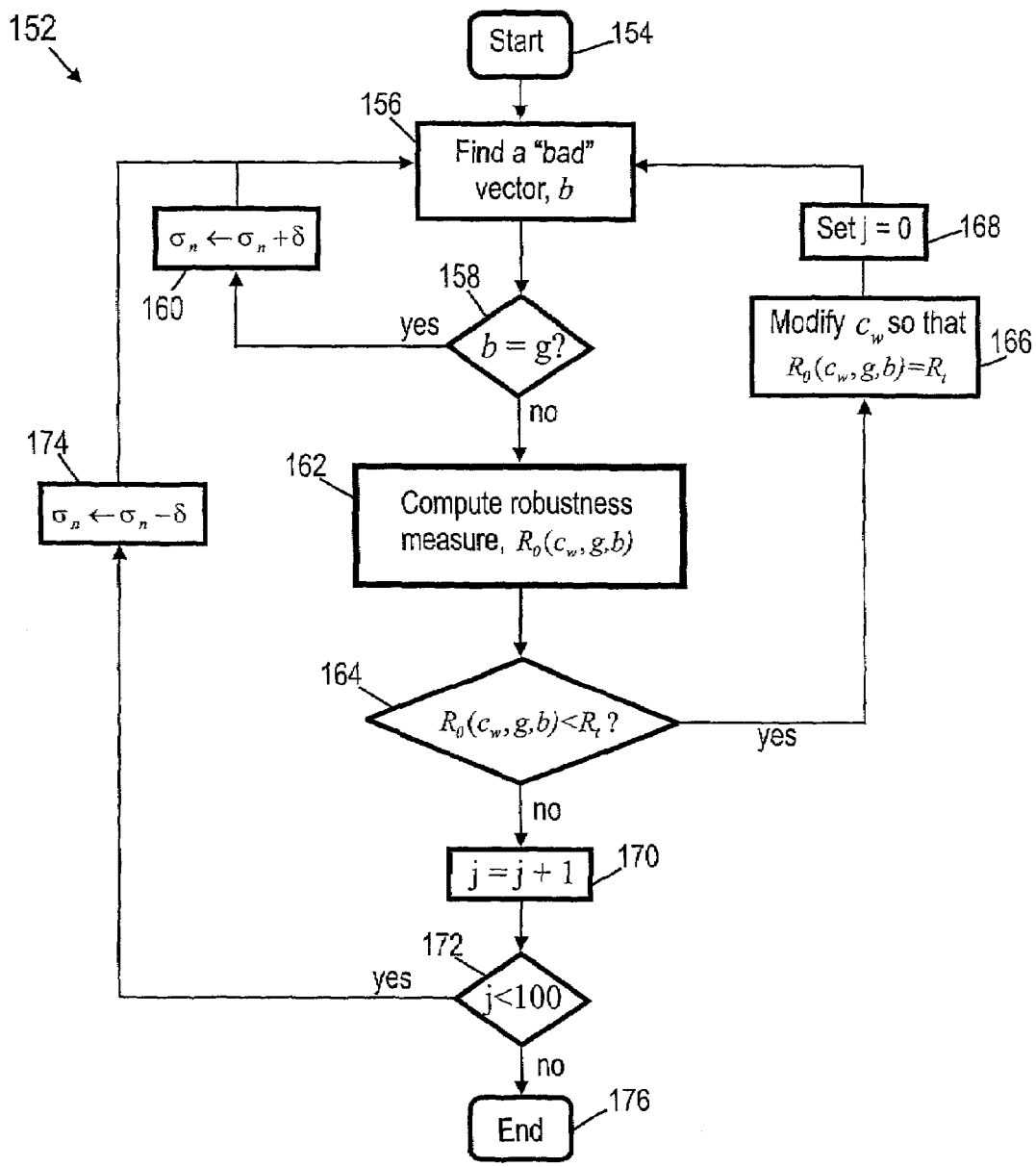
FIG. 17 is a flowchart illustrating an informed embedding method according to the present invention.

Thus, the preferred, general version of our informed embedding algorithm is shown in FIG. 17. At the start 154, $g=W(m)$, $c_w=c_o$, $\sigma_n=0$, and $j=0$. At 156, $b=W(D(c_w+n))$, where n is a random vector with each element drawn independently from a Gaussian distribution with variance $\sigma_n^2$. If, at 158, b=g, then $\sigma_n \leftarrow \sigma_n+\delta$ at 160, and go back 156. The measure of robustness is computed at 162. If, at 164, $R_0(c_w,g,b)<R_t$, then modify $c_w$ at 166, according to Equations (1.1). The value of j is reset to zero at 168, and the method returns to 156. If $R_0(c_w,g,b)>R_t$ at 164, then increment j at 170. If j<100 at 172, then $\sigma_n \leftarrow \sigma_n-\delta$ at 174 and go back to 156. Otherwise, terminate at 176.

Embedding Algorithm for Trellis Codes

The general method outlined above is very slow, as it can often take many thousands of iterations to terminate. When implemented with a trellis-coded watermarking system of the present invention, each iteration requires running a Viterbi decoding algorithm on the entire work. This, in turn, requires performing L×A number of length N correlations, where A is the number of arcs in each step of the trellis.

Thus, instead of adding noise to $c_w$ and running the detector in each iteration, a modified version of the Viterbi decoding algorithm is used that produces probabilistic results. Normally, the Viterbi algorithm maintains a table that indicates the correlation between an extracted vector, v, and the vectors for the paths up to all the states in a given step of the trellis. The modified decoder of the present invention adds a random number to each value in this table before proceeding to the next step of the trellis. This means that the decoder might return a path other than the one that yields the highest correlation with v.

The behavior of the modified Viterbi decoder is similar to the results of adding noise to $c_w$ before running the detector, but it is not identical. Nevertheless, the performance of an exemplary embodiment of an informed embedder according to the present invention was unaffected by the difference. By using the modified Viterbi decoder, the running time can be significantly reduced because the correlations for the arcs of the trellis need not be recomputed every time the detector is used. Instead, they need only be recomputed when $c_w$ is modified.

Figure 6:
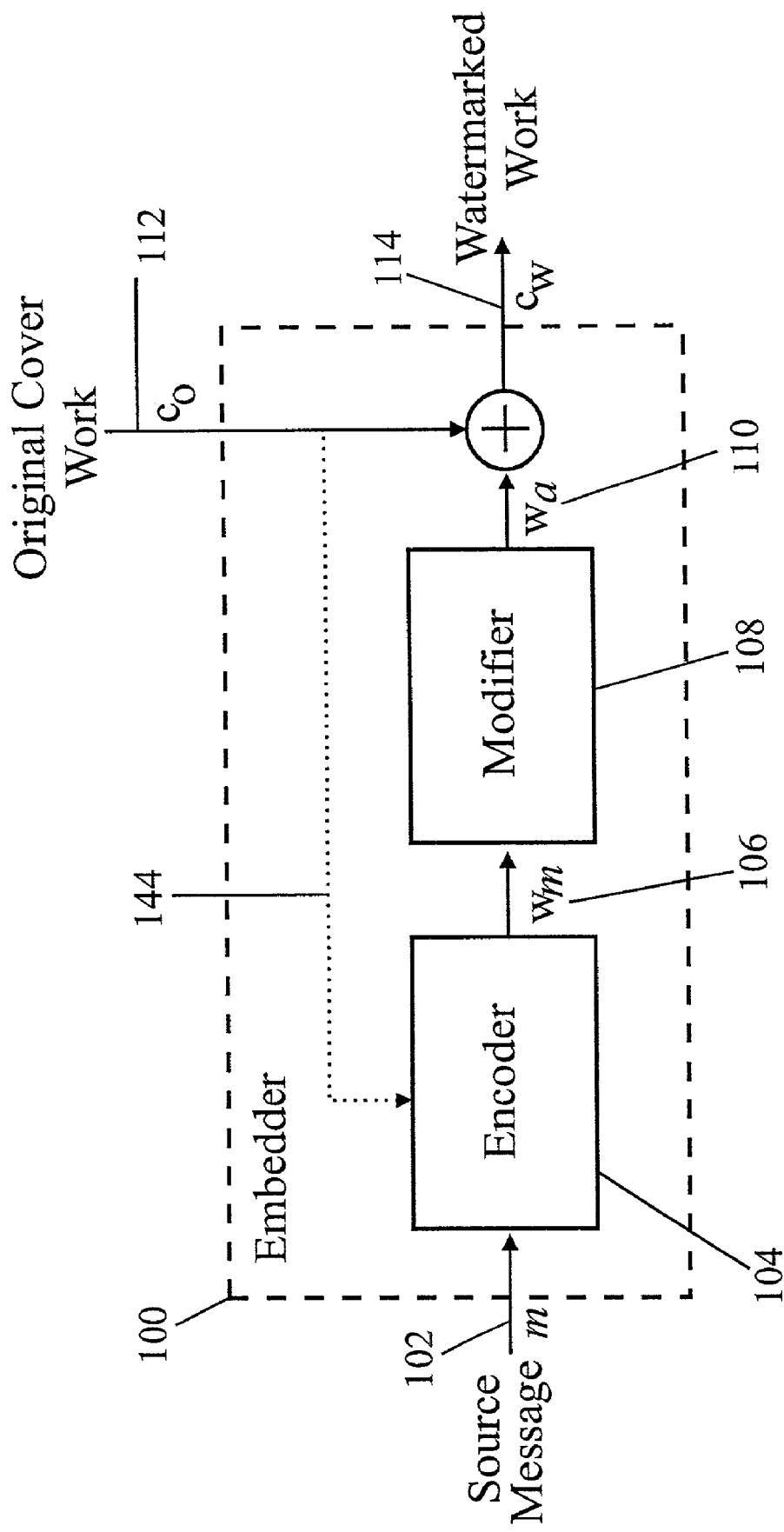
FIG. 6 is a schematic illustration of an informed coder.

The embedding algorithm of the present invention, as described supra, uses information contained in the cover work during the modification stage. However, each message is represented by a unique codeword that is independent of the work. Better results can be obtained if the coding process itself is a function of the cover work. Therefore, we now consider informed coding, in which each message is mapped into a set of alternative codewords, and the choice of which codeword to embed is determined by information contained in the cover work. This is illustrated conceptually in FIG. 6, particularly link 144 showing the connection between the input cover work 112 with the encoder 104.

A modification of a traditional trellis code can produce what is known as a dirty-paper code, or a code having alternate codewords corresponding to a single message. See, Costa, *Writing on Dirty Paper*, IEEE Trans. Inform. Theory, Vol. 29, pp. 439–442, 1983. The present code allows a straightforward application of the informed embedding method described supra.

FIG. 2 shows an example of a traditional trellis 118 code. In this code, two arcs 120a, 120b, exit from each state. Bold arcs 120b correspond to a 1 bit in the coded message, and non-bold arcs 120a correspond to a 0 bit. This traditional trellis 118 coding scheme assigns one unique path to each message once a starting state has been chosen.

Figure 7:
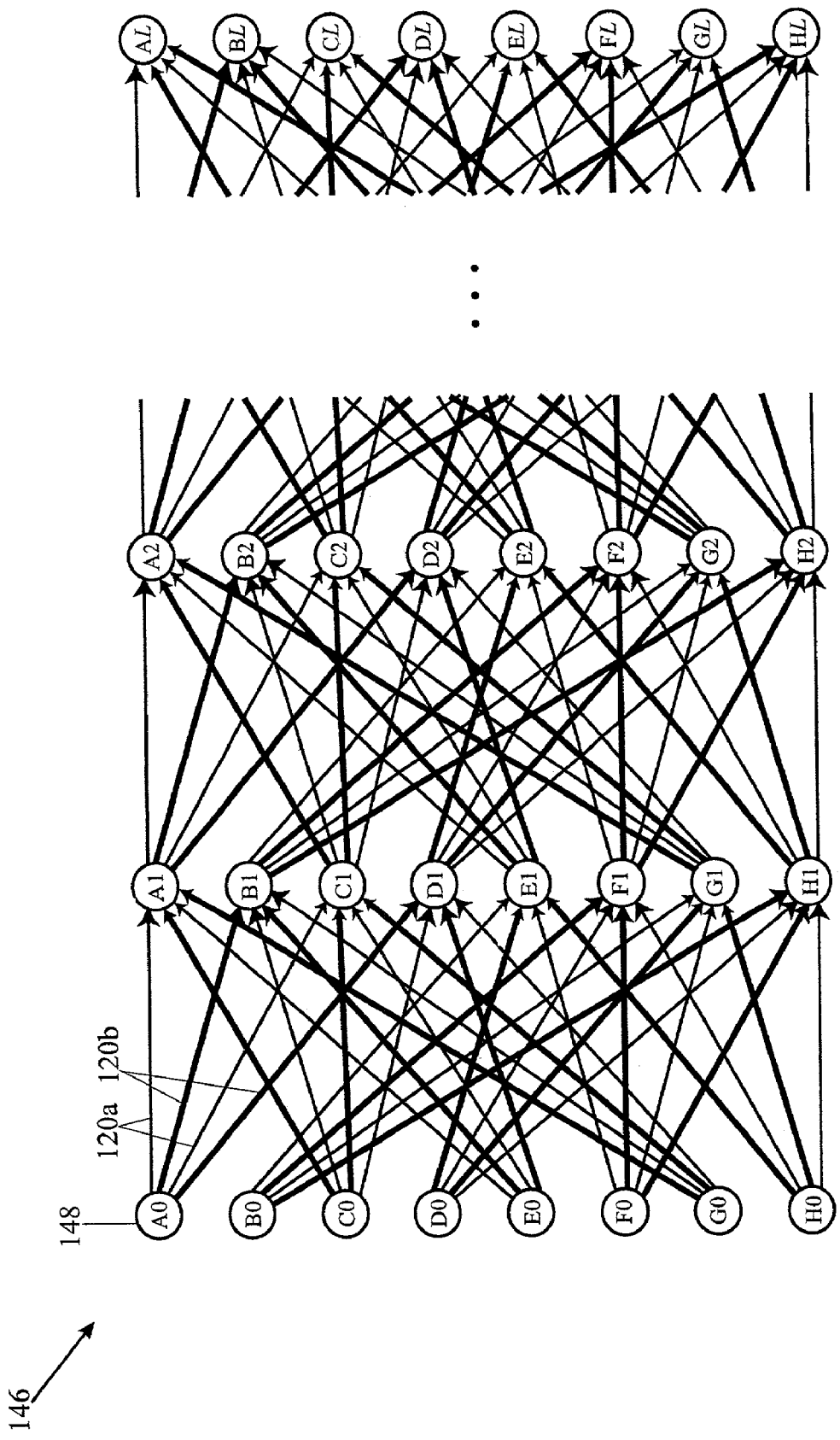
FIG. 7 illustrates a modified Trellis code structure according to the present invention.

To create a dirty-paper code, the trellis is modified so that multiple alternative codewords can be obtained for each message. The basic idea is to have more than two arcs 120 enter and exit each state, but still use each step of the trellis to encode a single bit. This modified trellis 146 is shown in FIG. 7.

Assume some number, A, of arcs 120 and some number, S, of states 148. Since there is no reason to privilege one node more than another, A/S arcs 120 exit and enter each state 148. Half of those arcs 120 will encode a 0, illustrated as non-bold arcs 120a. The other half will encode a 1, illustrated as bold arcs 120b. There are now many alternative paths in the modified trellis 146 that encode the same message. Suppose we wish to encode an L-bit long message, m. If we do not impose any starting state, the number of codewords, n, which encode the message m is given by:

$$n = S\left(\frac{A}{2S}\right)^L \quad (1.2)$$

Figure 8:
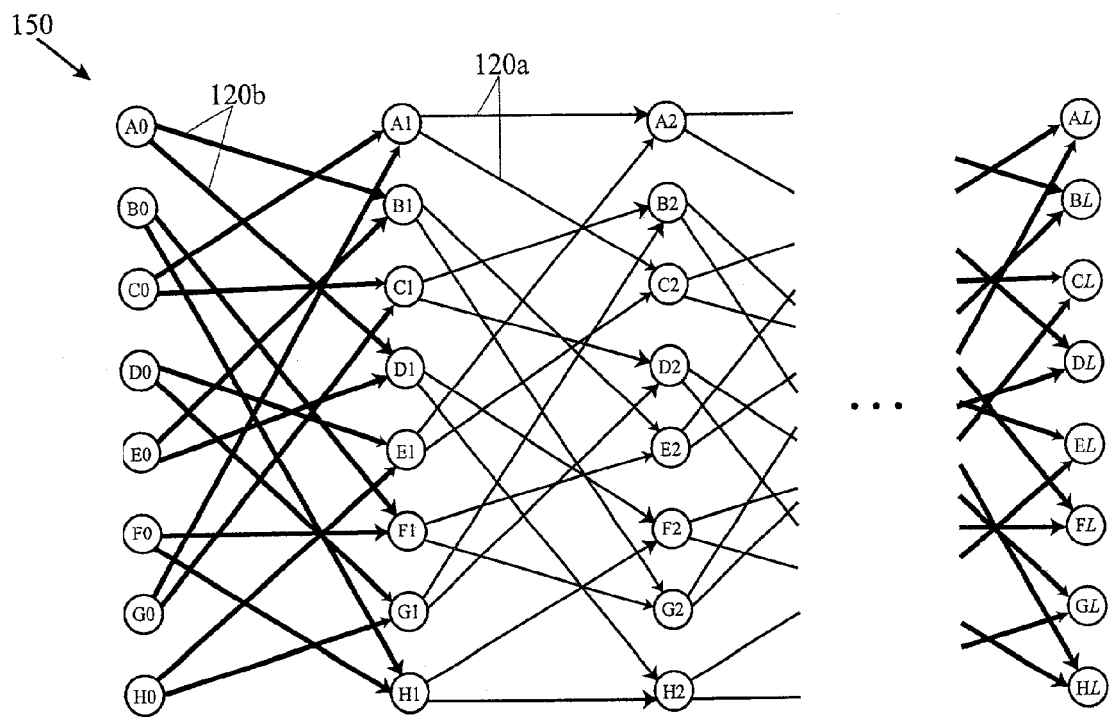
FIG. 8 illustrates a message-specific modified Trellis code structure according to the present invention.
Figure 18:
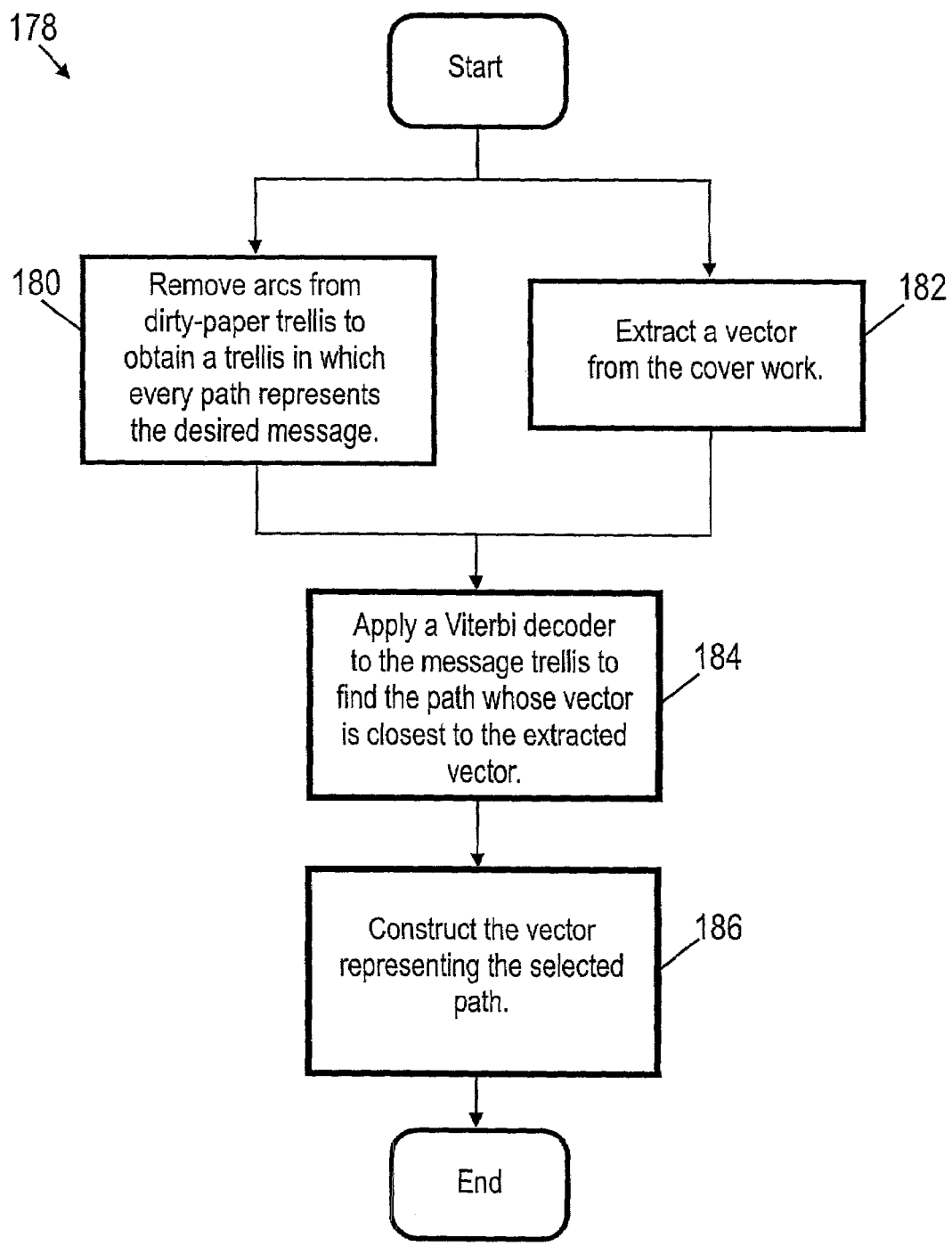
FIG. 18 is a flow chart illustrating an informed coding method according to the present invention.

As shown in FIG. 18, an encoder according to the present method can select a path from the set of paths through the modified trellis 146 that all represent that message that is to be embedded, generally 178. Conceptually, this can be thought of as being done in two steps. First, the modified trellis 146 is redrawn at 180 to eliminate all paths that do not encode the desired message. This is a simple matter of removing the bold arcs 120b from steps that should encode 0's, and removing non-bold arcs 120a from steps that should encode 1's. As a result, every possible path illustrated represents the desired message. An example of such a message-specific modified trellis 150 is shown in FIG. 8.

Second, the encoder applies the detection algorithm to the original cover work 112, as described above, except that it uses the message-specific modified trellis 150 instead of the complete modified trellis 146. That is, it extracts a vector from the work, shown at 182, and then uses a Viterbi decoding algorithm to find the path through the message-specific modified trellis 150 that yields the highest correlation with that extracted vector, shown at 184. This identifies which of the plethora of codes is to be used to represent the message. This path is then represented by a constructed vector, shown at 186. Once the highest-correlation path through the message-specific modified trellis 150 has been identified, the informed embedding algorithm described above, for example, or another suitable embedding algorithm, can be used to embed the watermark into the cover work 112. During the detection process, the decoder applies the Viterbi algorithm to the entire modified trellis 146. This identifies the path that yields the highest correlation with the watermark. The message is then decoded by looking at the bits represented by the arcs in that path.

Modified Trellis Structure

Given the general framework of the algorithm, the number of arcs, A, and states, S, can impact the effectiveness of the embedding method.

Figure 9:
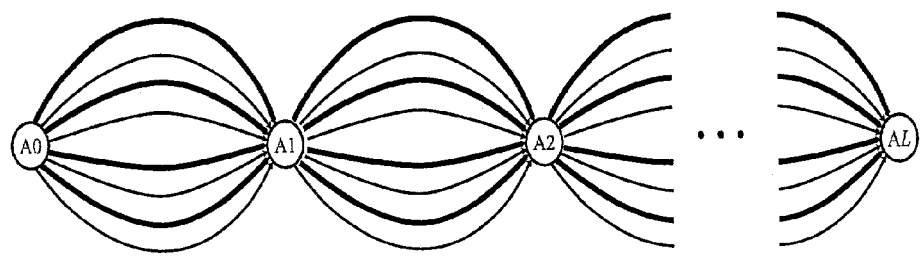
FIG. 9 illustrates a single-state trellis code structure having multiple parallel paths.

If the number of arcs per state is greater than the number of states (A/S>S), there will be some parallel arcs in the trellis, i.e., there will be several arcs linking the same pair of states. In the extreme case of only a single state, (S=1), all the arcs are parallel arcs as depicted in FIG. 9.

If the number of arcs per state is equal to the number of states (A/S=S), then the trellis is fully connected, i.e., each state is exactly connected once with itself and every other state.

If the number of arcs per state is lower than the number of states (A/S<S), not all the states can be reached from any given state. This is the case depicted in FIG. 7 (S=8, A=32).

Two experiments were performed to investigate how the structure of the trellis influences the effectiveness of the watermarking scheme. In both experiments, a uniformly distributed, random vector simulated the extracted vectors. Each arc of the trellis was represented with a length N=64 vector. Since the experiment sought to examine the effectiveness of informed coding only, the mark output by the coder was blindly embedded with varying strengths, $\alpha$. Immediately after embedding, the detector was applied to decode the watermark, and the resulting bit error rate (BER) was measured.

It must be noted that the bit error rate, as opposed to the message error rate, is effected in several different ways by the structure of the trellis. In particular, when the number of arcs per state is lower than the number of states (A/S<S), then whenever an error occurs it may take several steps in the trellis before we return to the correct path. This will introduce burst errors in the decoded messages, increasing the bit error rate. However, since multiple errors should reduce the correlation with the extracted vector, we expect them to happen rarely. In contrast, in a trellis with only one state, whenever an error occurs the decoder can immediately return to the correct path at the next iteration. Thus, in this configuration, a single error does not induce consecutive errors. However, the cost of single errors is less than for burst errors and they may therefore occur more frequently.

Figure 10:
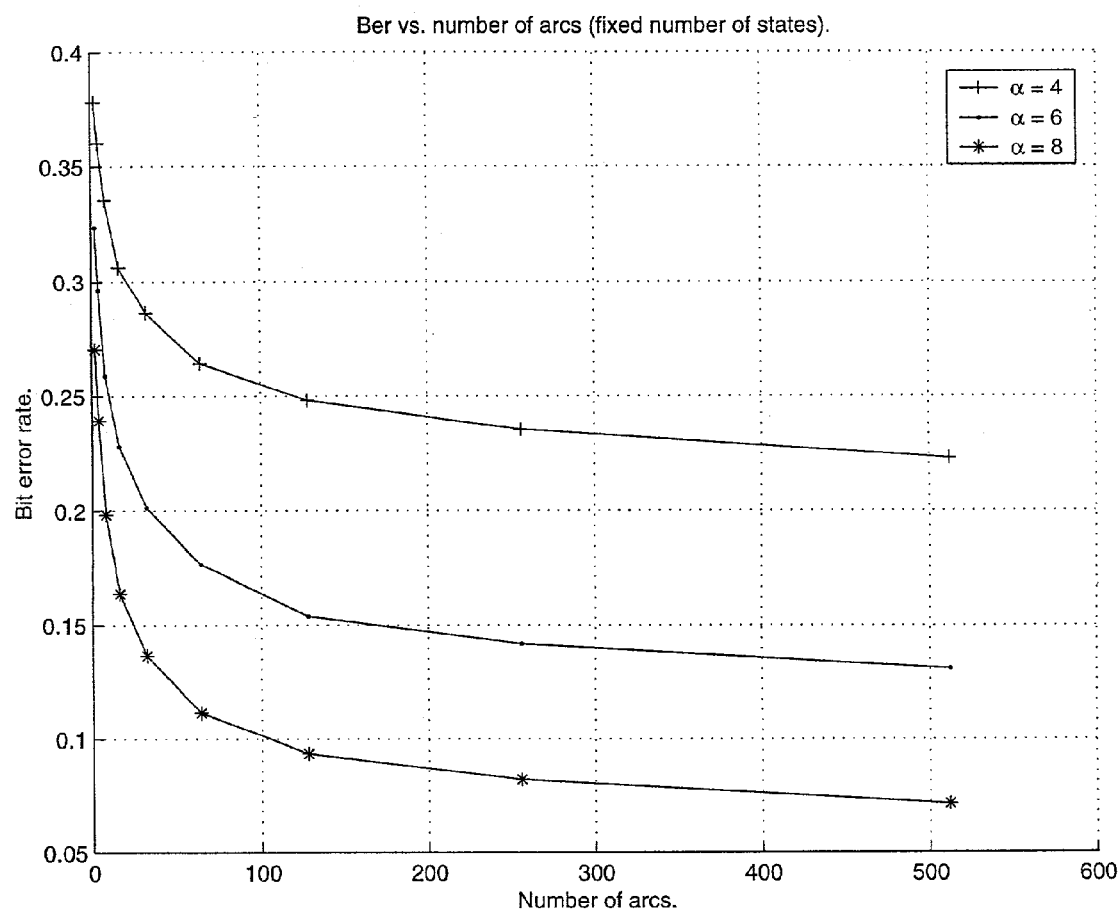
FIG. 10 is a graph of experimental results of bit error rate v. number of arcs, using a fixed number of states.

In the first experiment, the number of states was set to 1 (S=1) and number of arcs was varied. According to equation (1.2), this means that the number of codewords representing the same message is varying. The results are shown in FIG. 10. One can observe a very significant reduction in bit error rate as the number of arcs increases from 2 to 64. Performance continues to improve as the number of arcs increases beyond 64, but the improvement is less dramatic. Since computational cost increases with the number of arcs, a good compromise appears to be A=64. This is, however, simply an intuitive choice. Further study could determine an optimum number of arcs to balance between bit error rate and computational overhead. For one state and sixty-four arcs, equation (1.2) yields the number of codewords, n, that encode a message.

In a second experiment, the number of states and the number of arcs were varied in such a way that the number of codewords representing the same message was kept constant at $n=10^{2073}$.

Figure 11:
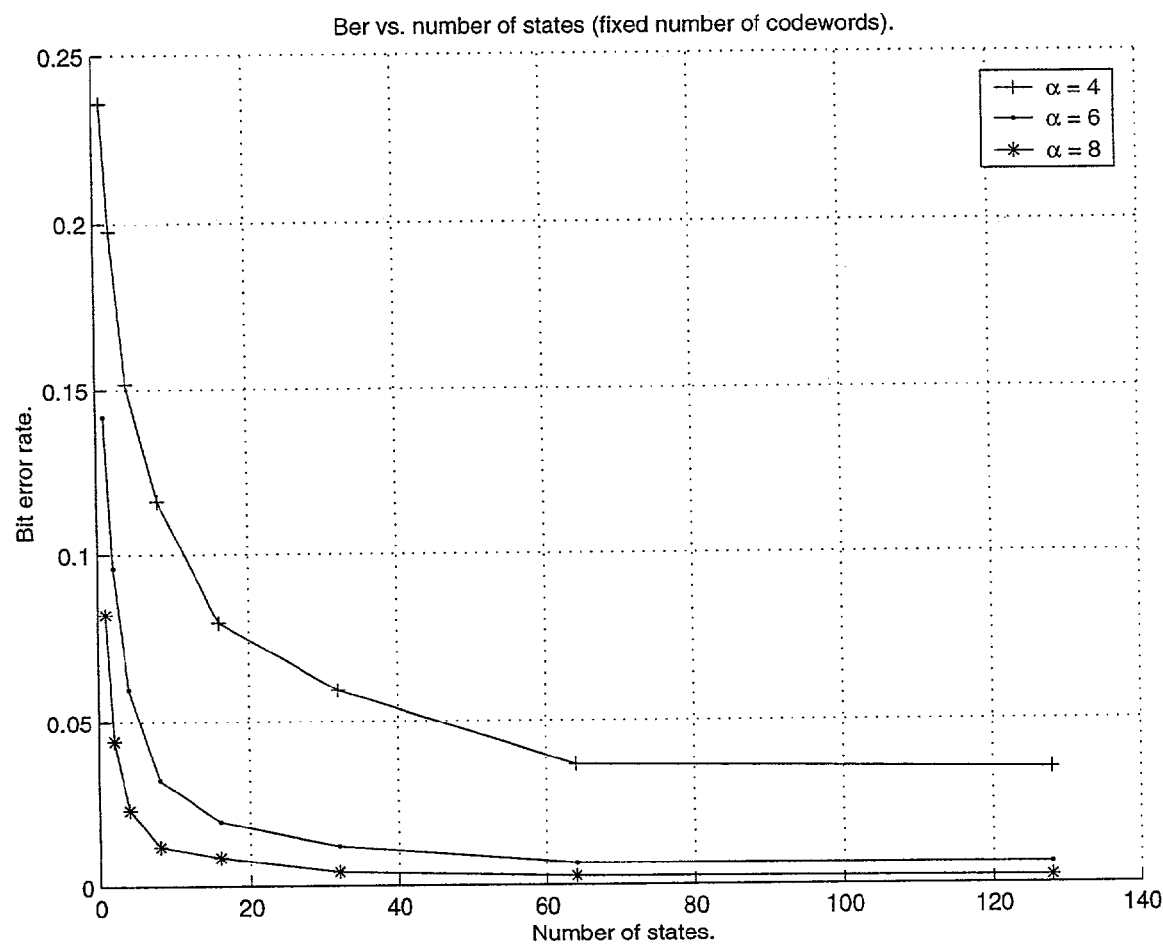
FIG. 11 is a graph of experimental results of bit error rate v. number of states, using a fixed number of codewords.

The results are shown in FIG. 11. Once again, the error rate quickly drops as the number of states grows before flattening as the number of states exceeds 64. Thus, there seems little advantage in increasing the number of states beyond this point. The two experiments suggest that a configuration of 64 states and 64 arcs per states is a reasonable compromise.

To demonstrate the improvement due to informed coding, 2000 images were watermarked with informed coding (using a trellis of 64 states and 64 arcs per state) and informed embedding.

Immediately after embedding, the 2000 images were sent to a watermark detector and the message error rate (MER) was calculated. These results were then compared with the results in which blind coding and informed embedding were applied. The image fidelity is significantly improved with informed coding. To quantify this, the average perceptual distance according to Watson's model was calculated in both cases. The results are summarized in Table I in which we see that the message error rate has been reduced from 12.5% to zero while simultaneously improving the image quality. The average perceptual distance using informed coding is about half that using blind coding.

TABLE I

BLIND CODING VERSUS INFORMED CODING

| | Watson distance | MER |
|---|---|---|
| Blind coding + informed embedding | 201.06 | 12.5% |
| Informed coding + informed embedding | 101.52 | 0% |

To examine how much of this performance improvement was due to informed coding alone, a second experiment was performed in which 2000 images were watermarked using informed coding and blind embedding. The blind embedding strength was chosen to yield an average Watson distance of 101, i.e., roughly the same as the previous experiment with informed coding and informed embedding. Once again, the effectiveness of the embedder was measured. These results are summarized in Table II. This shows that our informed coding algorithm alone makes a significant improvement over blind coding, but its effectiveness is not satisfactory without informed embedding.

TABLE II

BLIND EMBEDDING VERSUS INFORMED EMBEDDING WITH INFORMED CODING

| | Watson distance | MER |
|---|---|---|
| Informed coding + blind embedding | 101.79 | 56.55% |
| Informed coding + informed embedding | 101.52 | 0% |

Perceptual Shaping

The combination of informed coding and informed embedding is promising. However, many of the resulting watermarked works, particularly images, still have unacceptable fidelity. To alleviate this problem, a perceptual shaping stage is added to the proposed algorithm, based on Watson's perceptual measure.

The perceptual shaping is based on the E-PERC-OPT algorithm described in Cox, et al., *Digital Watermarking*. The basic idea is to shape the difference pattern d used in step 4 of the general informed embedding algorithm, described supra. In an exemplary embodiment, each element of a watermark vector in the present system is a single coefficient from the 8×8 block DCT of an image. However, the elements of the watermark vector may be pixel values, wavelet values, or Fourier Transform coefficients, for example, without departing from the scope of the invention. Watson's model assigns a perceptual "slack" to each element, which indicates how much that element may be changed before becoming perceptually noticeable. The slacks for the low-frequency AC terms 124 can be arranged into a vector, s, such that the i'th component, s[i], is the slack for the i'th element of the extracted vector. The perceptual shaping of d is then performed as $$d'[i] = (d[i]s[i]^4)^{\frac{1}{3}} \quad (1.3)$$

This results in the vector, d'[i], that yields greatest similarity, one measure of which would be correlation, with d[i] for a given perceptual distance.

In step 4 of the general informed embedding algorithm, where $c_w$ is modified to ensure that $R_0(c_w,g,b) \geq R_t$, the equation (1.1) is no longer used. Rather, $c_w$ is now modified as follows:

$$d = \frac{g-b}{|g-b|}$$
$$d' = S(d, c_w)$$
$$\alpha = \frac{R_t - R_0(c_w, g, b)}{d' \cdot d}$$
$$c_w \leftarrow c_w + \alpha d'$$

where $S(d,c_w)$ is a perceptual shaping function computed according to Eq. (1.3).

This modification of the algorithm is not expected to affect the performance of the watermarking scheme since robustness is inherently ensured by the informed embedding algorithm.

To evaluate the effect of this perceptual shaping, 2000 images were watermarked with informed coding (64 states and 64 arcs per state), informed embedding and perceptual shaping. The Watson distance between the original and the watermarked images was then computed. A watermark detector was immediately applied to the 2000 watermarked images and the message error rate was computed.

The results are summarized in Table III. While the message error rate has increased only insignificantly, the perceptual distance between watermarked and unwatermarked images has been reduced three-fold.

TABLE III

EFFECT OF PERCEPTUAL SHAPING

| | Watson distance | MER |
| --- | --- | --- |
| Informed coding + informed embedding | 101.52 | 0% |
| Informed coding + informed embedding + perceptual shaping | 31.6 | 0.35% |

However, there are limitations with Watson's model. Some undesirable blocking artifacts appeared along sharp edges, particularly on the right side of the image, where there was a thin black border. This is because Watson's model is block-based and each block is independently examined. Blocks that contain sharp edges contain energy in all frequencies, and are erroneously judged to contain much texture that can mask watermark patterns.

Robustness

The experiments described above have examined only the embedding effectiveness of the watermark embedder, i.e., the performance when the watermarked image is not distorted between the times of embedding and detection. In practice, watermarked content will be subjected to a variety of distortions before reaching the detector. Watermarks designed to survive legitimate and everyday usage of content, e.g., low pass filtering, noise, JPEG compression, are referred to as robust watermarks.

Experiments were conducted to measure the effect of a wide range of distortions on three different watermark algorithms: (i) blind coding, informed embedding, no shaping (BCIENS); (ii) informed coding, informed embedding, no shaping (ICIENS); and (iii) informed coding, informed embedding and shaping (ICIES). Algorithms employing blind embedding were not tested, since they have been found to have unacceptable performance even without image distortions. We report robustness results for addition of Gaussian noise, low pass filtering, valumetric scaling, and JPEG compression. For each class of distortion, the 2000 watermarked images were modified with a varying magnitude of distortion. The message error rate was then computed. We considered the watermarking scheme to be robust if at least 80% of the watermarks were correctly retrieved, i.e. the message error rate is below 20%.

Gaussian Noise

Figure 12:
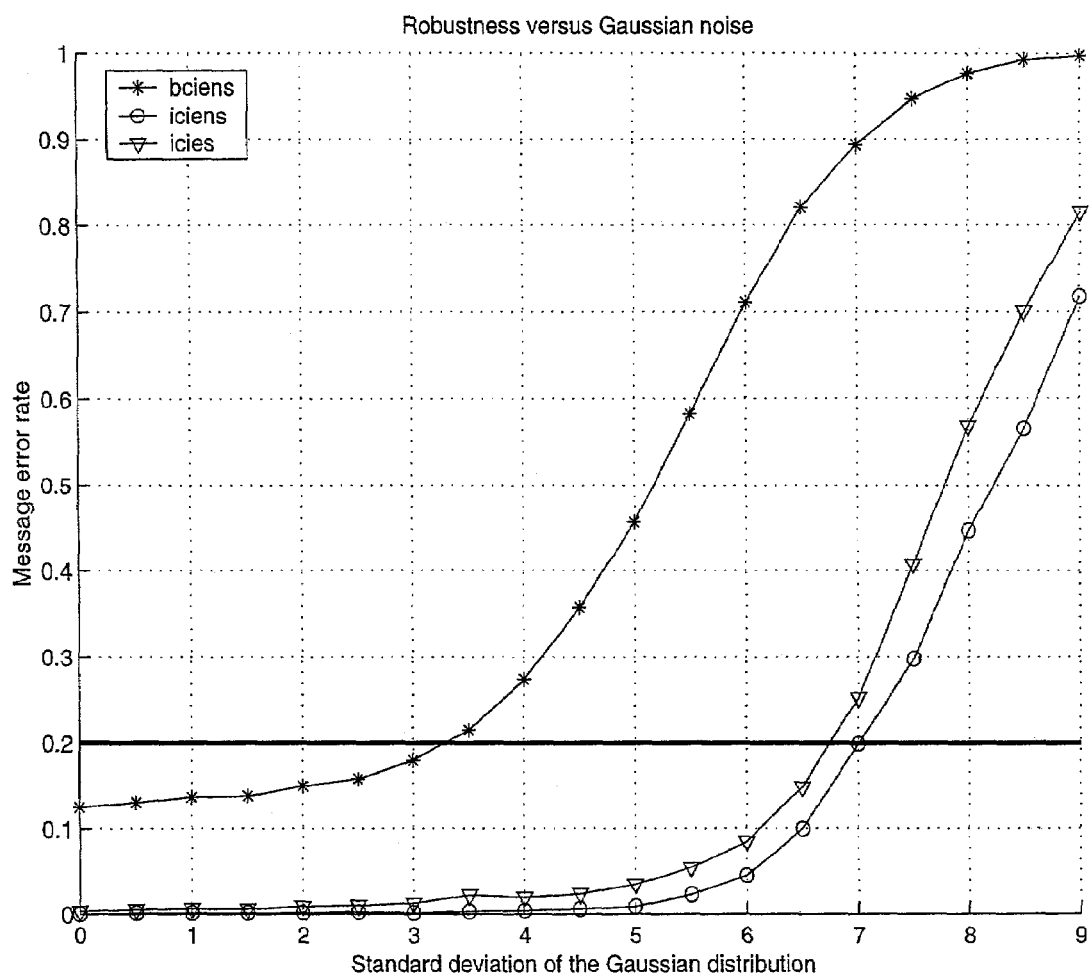
FIG. 12 is a graph of experimental results of message error rate v. the standard deviation of Gaussian noise added.

Normally distributed noise with mean=0 and standard deviation σ was added to each of the watermarked images. The experiment was repeated for different standard deviations, σ, and the message error rate has been computed. The results are summarized in FIG. 12. Notice that the two schemes that use informed coding—ICIENS (no perceptual shaping) and ICIES (with perceptual shaping)—have quite similar performance. This is because the perceptual shaping does not interfere with informed embedding, as explained above. Remember, however, that images embedded using the ICIES algorithm have substantially better fidelity.

The gain obtained by introducing informed coding is quite noticeable. If we establish a threshold at a message error rate of 20%, then blind coding with informed embedding and no shaping (BCIENS) is robust against additive Gaussian noise with standard deviation, σ, of only 3.25 or less. In contrast, the two informed coding methods are robust to standard deviations up to 6.5.

Low Pass Filtering

All three watermarking schemes tested use only low frequency DCT coefficients. As a result, they can be expected to be quite resilient against low pass filtering. To verify this, the watermarked images were filtered with Gaussian filters of width $\sigma_g$. The experiment was repeated for different values of $\sigma_g$ and the message error rate computed.

Figure 13:
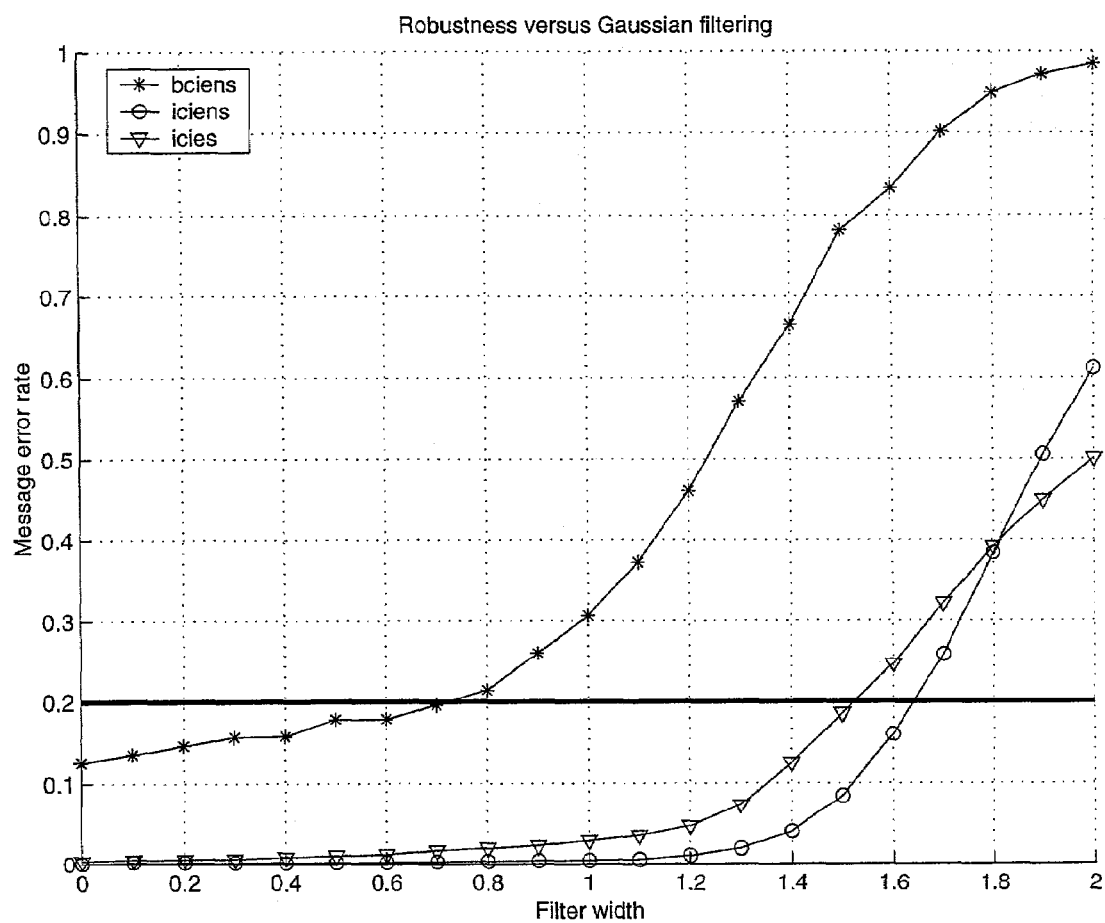
FIG. 13 is a graph of experimental results of message error rate v. the standard deviation of Gaussian filtering.

FIG. 13 summarizes the results. Once again, the informed coding methods have similar performance and the improvement between blind coding and informed coding is clear. With blind coding, the message error rate reaches 20% with a Gaussian filter of width $\sigma_g=0.7$. In contrast, with informed coding, the images can be filtered with a Gaussian filter of width $\sigma_g=1.5$ before the same message error rate is reached.

Valumetric Scaling

Another simple, but important distortion is changing amplitude. That is $$c_n = vc$$

where c is an image and v a scaling factor. This corresponds to a change of brightness and contrast for images and video. This attack is of particular interest for us, and was indeed a main weakness of prior informed watermarking schemes.

Two tests were performed. The first reduced the image intensities, i.e. v varied from 1 to 0.1. The second experiment increased the image intensities as v increased from 1 to 2.

Figure 14:
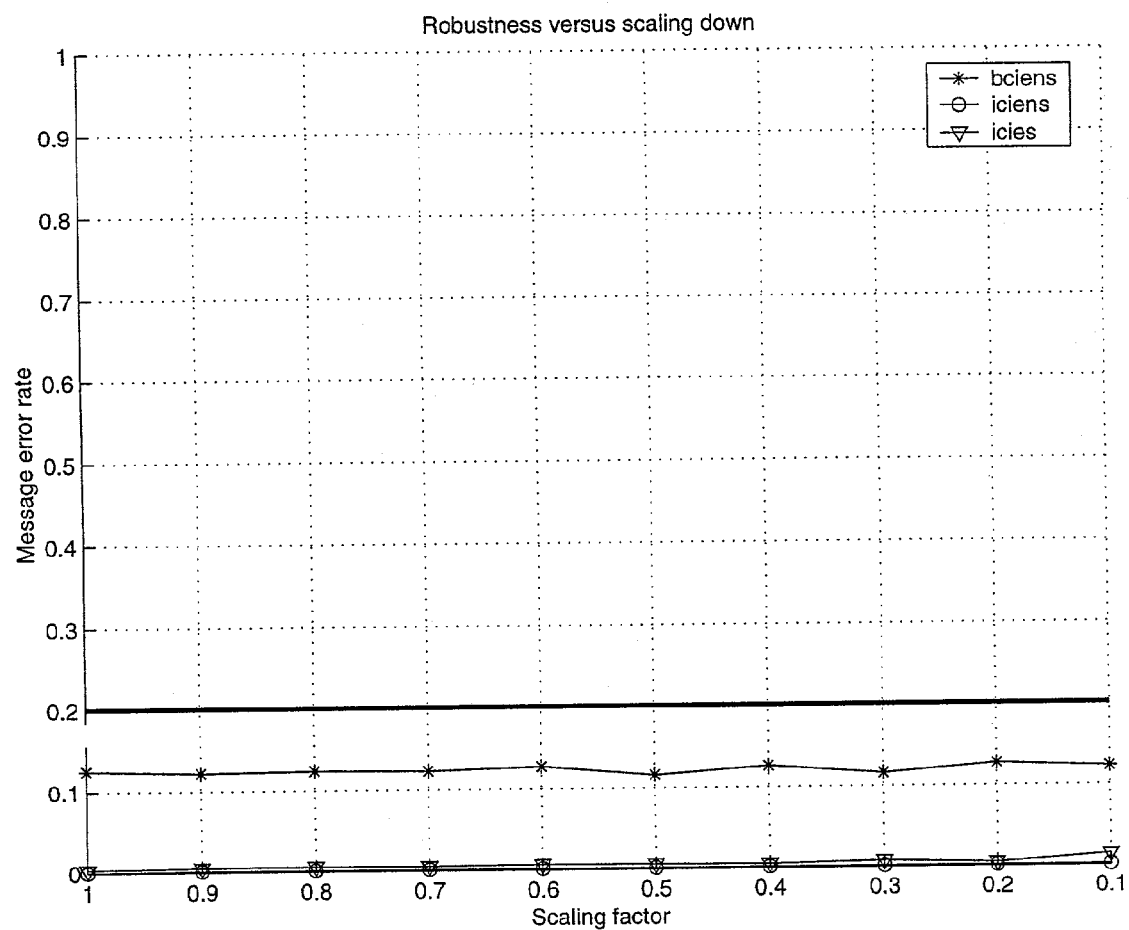
FIG. 14 is a graph of experimental results of message error rate v. a reducing scaling factor.

The results of the first test are summarized in FIG. 14. As usual, the two informed coding methods have very similar performance and are superior to the blind coding method. The results clearly demonstrate that the watermarking schemes described herein are resilient against valumetric scaling down. Whatever watermarking scheme is chosen, its performance remains the same down to a scaling factor of 0.1.

A scaling with a factor of 0.1 produced serious image degradation. An example of a scaled image with such a scaling factor is almost completely black. However, even if the distorted image is much darker, the hidden message is still correctly extracted. This is because valumetric scaling multiplies all the correlation scores by the same scaling factor (modulo some rounding). As a result, the best path along the trellis remains the same.

Figure 15:
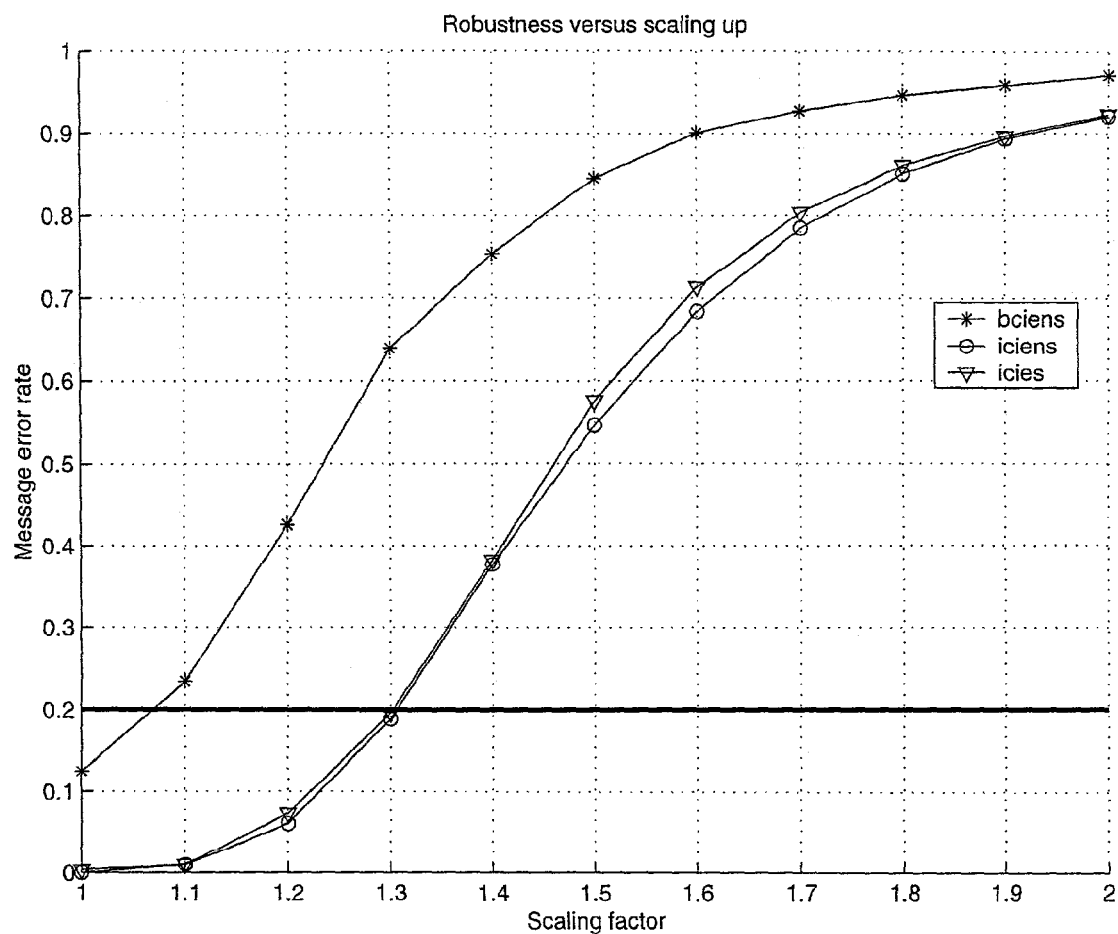
FIG. 15 is a graph of experimental results of message error rate v. an increasing scaling factor.

A second test investigated the robustness of our watermarking methods to valumetric scaling for $1 \leq v \leq 2$. FIG. 15 summarizes the results. Once more, the two informed coding methods have similar performance and significantly out-perform the blind coding method. While the blind coding method survives scaling by a factor of $v \approx 1.1$, the two informed coding methods remain robust for scale factors up to $v=1.3$.

The robustness to scaling intensities up is much worse than the robustness to scaling intensities down. This is because, in addition to rounding, valumetric scaling up introduces some clipping, i.e., all the pixel values above 255 after scaling are truncated to 255. This has a more severe impact than rounding. An image valumetrically scaled up by a factor of $v=1.3$ is globally brighter, but one can also notice that some textured areas becoming uniformly white after such scaling.

Lossy Compression

The effects of JPEG compression were simulated by applying quantization in the DCT domain. The block-DCT transform was computed for each watermarked image. Then, the DCT coefficients were quantized according to the following equation:

$$c_n[i] = q\left\lfloor \frac{c[i]}{q} + 0.5 \right\rfloor$$

where q is a constant quantization factor, using a different quantization factor for each of the 64 terms. The quantization factors q are obtained by multiplying a global quantization level Q by the matrix of DCT term-specific quantization factors shown in Table V. For example, if Q=2, the DC term is quantized with q=32 and the highest-frequency term with q=198. The more compressed the image, the greater the global quantization level Q. After quantization, the inverse block-DCT was applied. The watermarked images were quantized with different values for the parameter Q and the message error rate was computed.

TABLE V

LUMINANCE QUANTIZATION MATRIX USED IN JPEG

| 16 | 11 | 10 | 16 | 24 | 40 | 51 | 61 |
|---|---|---|---|---|---|---|---|
| 12 | 12 | 14 | 19 | 26 | 58 | 60 | 55 |
| 14 | 13 | 16 | 24 | 40 | 57 | 69 | 56 |
| 14 | 17 | 22 | 29 | 51 | 87 | 80 | 62 |
| 18 | 22 | 37 | 56 | 68 | 109 | 103 | 77 |
| 24 | 35 | 55 | 64 | 81 | 104 | 113 | 92 |
| 48 | 64 | 78 | 87 | 103 | 121 | 120 | 101 |
| 72 | 92 | 95 | 98 | 112 | 100 | 103 | 99 |

Figure 16:
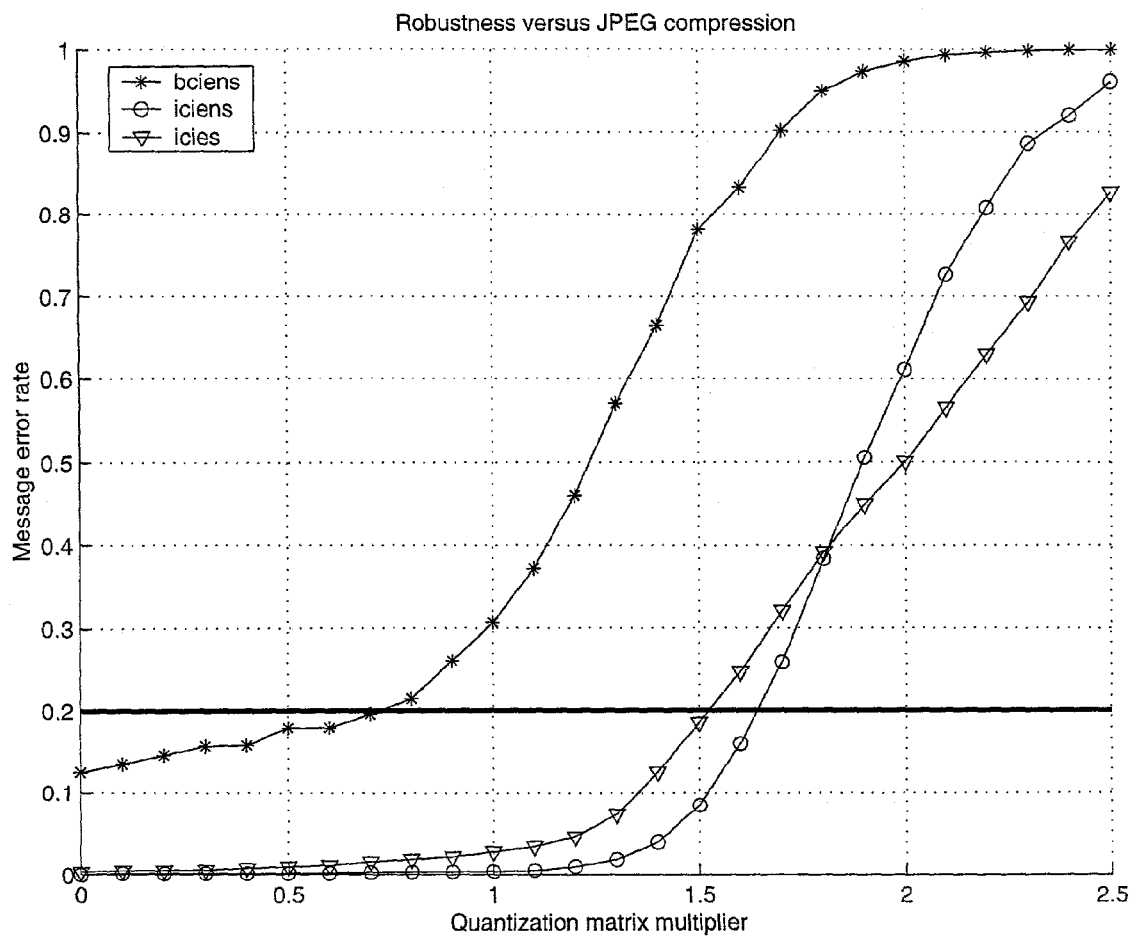
FIG. 16 is a graph of experimental results of message error rate v. increasing levels of JPEG compression, measured by a quanization matrix multiplier.

The results are summarized in FIG. 16. Again, the two informed coding methods have similar performance and significantly out-perform the blind coding method. The blind encoding method only remains robust for values of Q less than 0.75, while the informed coding methods remain robust for $Q \leq 1.5$. The latter value corresponds to a JPEG quality factor of 33%. Lossy compression with a global quantization level Q=1.5 yields an image fidelity that is very much degraded.

Disclosed is a method for informed encoding and informed embedding of watermark signals in a work. Note that the advantages and benefits of this disclosed watermarking system remain with the watermarked work even when it is transferred to the analog domain.

The method may be carried out using conventional computer apparatus, or with a dedicated apparatus, either modular or integrated. The method may also be programmed for machine execution and stored on machine-readable media.

The invention has been described herein with reference to a particular exemplary embodiment. Certain alterations and modifications may be apparent to those skilled in the art, without departing from the scope of the invention. The exemplary embodiment is not meant to be limiting on the scope of the invention, which is defined by the appended claims.

What is claimed is:

1. A method for embedding a desired watermark message in a cover work, for extraction by a watermark extractor, the method comprising:

(a) finding an incorrect watermark message likely to be extracted from said cover work by said watermark extractor;

(b) calculating a robustness measure, indicating the probability that said incorrect watermark message would not be extracted from said cover work;
(c) if said robustness measure is less than a predetermined value, modifying said cover work to increase said robustness measure; and
(d) repeating steps (a)–(c) until a termination condition is met.

2. The method according to claim 1, wherein said termination condition is that said robustness measure exceeds a predetermined value.

3. The method according to claim 1, wherein said termination condition is that a predetermined limit is exceeded by a count of the number of consecutive iterations of steps (a)–(c) in which said robustness measure exceeds a predetermined value.

4. The method according to claim 3, wherein said predetermined limit is 100.

5. The method according to claim 1, wherein said finding an incorrect watermark message comprises:
(i) adding a quantity of noise to said cover work;
(ii) applying said watermark extractor to said cover work to obtain said incorrect watermark message; and
(iii) repeating steps (i)–(ii) until said incorrect watermark message is different from said desired watermark message.

6. The method according to claim 5, wherein said quantity of noise is increased each time (b) obtains an incorrect watermark message identical to the desired watermark message.

7. The method according to claim 5, in which said quantity of noise is decreased each time (ii) obtains an incorrect watermark message for which said robustness measure exceeds a predetermined value.

8. The method according to claim 1, wherein said robustness measure is obtained according to the formula:

$$R_0(c_w, g, b) = \frac{(g-b) \cdot c_w}{|g-b|}$$

where g is a vector representing said desired watermark message, b is a vector representing said incorrect watermark message, and $c_w$ is said cover work.

9. The method according to claim 1, wherein modifying said cover work is carried out according to the formulae:

$$d = \frac{(g-b)}{|g-b|}$$
$$\alpha = R_t - R_0(c_w, g, b)$$
$$c_w \leftarrow c_w + \alpha d$$

where g is a vector representing said desired watermark message, b is a vector representing said incorrect watermark message, $R_t$ is said predetermined value, $c_w$ is said cover work, and $R_0(c_w, g, b)$ is a function yielding said robustness measure.

10. The method according to claim 1, wherein modifying said cover work is carried out according to the formulae:

$$d = \frac{g-b}{|g-b|}$$
$$d' = S(d, c_w)$$
$$\alpha = \frac{R_t - R_0(c_w, g, b)}{d' \cdot d}$$
$$c_w \leftarrow c_w + \alpha d'$$

where g is a vector representing said desired watermark message, b is a vector representing said incorrect watermark message, $R_t$ is said predetermined value, $c_w$ is said cover work, $S(d, c_w)$ is a perceptual shaping function, and $R_0(c_w, g, b)$ is a function yielding said robustness measure.

11. The method according to claim 10, wherein said perceptual shaping function is computed as $$d'[i] = (d[i]s[i]^m)^n$$

where d'[i] and d[i] are the $i^{th}$ elements of d' and d, respectively, s[i] is a perceptual slack value indicating the relative amount that d[i] may be changed without perceptual impact, and m and n are constants.

12. The method according to claim 11, wherein m=4, and $$n = \frac{1}{3}.$$

13. The method according to claim 1, wherein said extraction by a watermark extractor comprises:
(i) obtaining an extracted vector from said cover work; and
(ii) decoding said extracted vector according to a trellis code.

14. The method according to claim 13, wherein obtaining an extracted vector comprises:
1. dividing said cover work into blocks;
2. computing the DCT's of said blocks to obtain block DCT's; and
3. placing selected terms of said block DCT's into a vector in a predetermined order to obtain said extracted vector.

15. A method of encoding a desired message in the form of a sequence of symbols drawn from an alphabet, for subsequent embedding in a cover work, the method comprising:
(a) selecting a path through a dirty-paper trellis, each arc in said path corresponding to one symbol in said desired message, said dirty-paper trellis having two or more arcs from each node corresponding to each symbol in said alphabet;
(b) combining vectors that indicate the arcs in said path to obtain a vector representation of said path; and
(c) encoding said desired message as said vector representation.

16. The method according to claim 15, wherein said alphabet is a binary alphabet comprising one and zero.

17. The method according to claim 15, wherein said selecting a path comprises:
(i) modifying said dirty-paper trellis by eliminating arcs corresponding to symbols other than those in said message, thus obtaining a message-specific trellis;
(ii) obtaining an extracted vector from said cover work; and (iii) selecting a path through said message-specific trellis whose vector representation is similar to said extracted vector.

18. The method according to claim 17, wherein said obtaining an extracted vector comprises:
   1. dividing said cover work into blocks;
   2. computing the DCT's of said blocks to obtain block DCT's; and
   3. placing selected terms of said block DCT's into a vector in a predetermined order to obtain said extracted vector.

19. The method according to claim 17, wherein said selecting a path through said message-specific trellis is performed by applying a Viterbi decoder.

20. The method according to claim 15, wherein said combining vectors is performed by concatenating vectors.

21. The method according to claim 1, wherein said desired watermark message, in the form of a sequence of symbols drawn from an alphabet, is encoded as a vector by:
   (a) selecting a path through a dirty-paper trellis, each arc in said path corresponding to one symbol in said desired message, said dirty-paper trellis having two or more arcs from each node corresponding to each symbol in said alphabet;
   (b) combining vectors that indicate the arcs in said path to obtain a vector representation of said path; and
   (c) encoding said desired watermark message as said vector representation.

22. The method according to claim 21, wherein said alphabet is a binary alphabet comprising one and zero.

23. The method according to claim 21, wherein said selecting a path comprises:
   (i) modifying said dirty-paper trellis by eliminating arcs corresponding to symbols other than those in said message, thus obtaining a message-specific trellis;
   (ii) obtaining an extracted vector from said cover work; and
   (iii) selecting a path through said message-specific trellis whose vector representation is similar to said extracted vector.

24. The method according to claim 23, wherein said obtaining an extracted vector comprises:
   1. dividing said cover work into blocks;
   2. computing the DCT's of said blocks to obtain block DCT's; and
   3. placing selected terms of said block DCT's into a vector in a predetermined order to obtain said extracted vector.

25. The method according to claim 23, wherein said selecting a path through said message-specific trellis is performed by applying a Viterbi decoder.

26. The method according to claim 21, wherein said combining vectors is performed by concatenating vectors.

27. The method according to claim 21, wherein modifying said cover work is carried out according to the formulae:

$$d = \frac{g - b}{|g - b|}$$
$$d' = S(d, c_w)$$
$$\alpha = \frac{R_t - R_0(c_w, g, b)}{d' \cdot d}$$
$$c_w \leftarrow c_w + \alpha d'$$

where g is a vector representing said desired watermark message, b is a vector representing said incorrect watermark message, $R_t$ is said predetermined value, $c_w$ is said cover work, $S(d,c_w)$ is a perceptual shaping function, and $R_0(c_w, g,b)$ is a function yielding said robustness measure.

28. The method according to claim 27, wherein said perceptual shaping function is computed as $$d'[i] = (d[i]s[i]^m)^n$$

where d'[i] and d[i] are the $i^{th}$ elements of d' and d, respectively, s[i] is a perceptual slack value indicating the relative amount that d[i] may be changed without perceptual impact, and m and n are constants.

29. The method according to claim 28, wherein m=4, and $$n = \frac{1}{3}.$$

30. An apparatus for embedding a desired watermark message in a cover work, for extraction by a watermark extractor, the apparatus comprising:
   means for finding an incorrect watermark message likely to be extracted from said cover work by said watermark extractor;
   means for calculating a robustness measure, indicating the probability that said incorrect watermark message would not be extracted from said cover work; and
   means for modifying said cover work to increase said robustness measure if said robustness measure is less than a predetermined value.

31. An apparatus for encoding a desired message in the form of a sequence of symbols drawn from an alphabet, for subsequent embedding in a cover work, the apparatus comprising:
   means for selecting a path through a dirty-paper trellis, wherein each arc in said path corresponds to one symbol in said desired message, said dirty-paper trellis having two or more arcs from each node corresponding to each symbol in said alphabet;
   means for combining vectors that indicate the arcs in said path to obtain a vector representation of said path; and
   means for encoding said desired message as said vector representation.

32. A machine-readable recording medium comprising a program of instructions, said program of instructions for causing a machine to execute a method for embedding a desired watermark message in a cover work, for extraction by a watermark extractor, the method comprising:
   (a) finding an incorrect watermark message likely to be extracted from said cover work by said watermark extractor;
   (b) calculating a robustness measure, indicating the probability that said incorrect watermark message would not be extracted from said cover work;
   (c) if said robustness measure is less than a predetermined value, modifying said cover work to increase said robustness measure; and
   (d) repeating steps (a)–(c) until a termination condition is met.

33. The machine-readable recording medium according to claim 32, wherein said termination condition is that a predetermined limit is exceeded by a count of the number of consecutive iterations of steps (a)–(c) in which said robustness measure exceeds a predetermined value.

34. The machine-readable recording medium according to claim 32, wherein said finding an incorrect watermark message comprises:
   (i) adding a quantity of noise to said cover work;
   (ii) applying said watermark extractor to said cover work to obtain said incorrect watermark message; and
   (iii) repeating steps (i)–(ii) until said incorrect watermark message is different from said desired watermark message.

35. The machine-readable recording medium according to claim 32, wherein modifying said cover work is carried out according to the formulae:

$$d = \frac{g-b}{|g-b|}$$
$$d' = S(d, c_w)$$
$$\alpha = \frac{R_t - R_0(c_w, g, b)}{d' \cdot d}$$
$$c_w \leftarrow c_w + \alpha d'$$

where g is a vector representing said desired watermark message, b is a vector representing said incorrect watermark message, $R_t$ is said predetermined value, $c_w$ is said cover work, $S(d,c_w)$ is a perceptual shaping function, and $R_0(c_w, g,b)$ is a function yielding said robustness measure.

36. The machine-readable recording medium according to claim 32, wherein said desired watermark message, in the form of a sequence of symbols drawn from an alphabet, is encoded as a vector by:
   (a) selecting a path through a dirty-paper trellis, each arc in said path corresponding to one symbol in said desired message, said dirty-paper trellis having two or more arcs from each node corresponding to each symbol in said alphabet;
   (b) combining vectors that indicate the arcs in said path to obtain a vector representation of said path; and
   (c) encoding said desired watermark message as said vector representation.

37. The machine-readable recording medium according to claim 36, wherein modifying said cover work is carried out according to the formulae:

$$d = \frac{g-b}{|g-b|}$$
$$d' = S(d, c_w)$$
$$\alpha = \frac{R_t - R_0(c_w, g, b)}{d' \cdot d}$$
$$c_w \leftarrow c_w + \alpha d'$$

where g is a vector representing said desired watermark message, b is a vector representing said incorrect watermark message, $R_t$ is said predetermined value, $c_w$ is said cover work, $S(d,c_w)$ is a perceptual shaping function, and $R_0(c_w, g,b)$ is a function yielding said robustness measure.

38. The machine-readable recording medium according to claim 36, wherein said selecting a path comprises:
   (i) modifying said dirty-paper trellis by eliminating arcs corresponding to symbols other than those in said message, thus obtaining a message-specific trellis;
   (ii) obtaining an extracted vector from said cover work; and
   (iii) selecting a path through said message-specific trellis whose vector representation is similar to said extracted vector.

39. A machine-readable recording medium comprising a program of instructions, said program of instructions for causing a machine to execute a method of encoding a desired message in the form of a sequence of symbols drawn from an alphabet, for subsequent embedding in a cover work, the method comprising:
   (a) selecting a path through a dirty-paper trellis, each arc in said path corresponding to one symbol in said desired message, said dirty-paper trellis having two or more arcs from each node corresponding to each symbol in said alphabet;
   (b) combining vectors that indicate the arcs in said path to obtain a vector representation of said path; and
   (c) encoding said desired message as said vector representation.

40. The machine-readable recording medium according to claim 39, wherein said selecting a path comprises:
   (i) modifying said dirty-paper trellis by eliminating arcs corresponding to symbols other than those in said message, thus obtaining a message-specific trellis;
   (ii) obtaining an extracted vector from said cover work; and
   (iii) selecting a path through said message-specific trellis whose vector representation is similar to said extracted vector.

* * * * *